(12) United States Patent
Casanellas Penalver et al.

(10) Patent No.: US 11,287,671 B2
(45) Date of Patent: Mar. 29, 2022

(54) METHOD FOR OPTIMISING A PROGRESSIVE OPHTHALMIC LENS AND METHOD FOR PRODUCING SAME

(71) Applicant: HORIZONS OPTICAL S.L.U., Sant Cugat Del Valles (ES)

(72) Inventors: Gloria Casanellas Penalver, Sant Cugat Del Valles (ES); Pau Artus Colomer, Sant Cugat Del Valles (ES); Antoni Vilajoana Mas, Sant Cugat Del Valles (ES)

(73) Assignee: HORIZONS OPTICAL S.L.U., Sant Cugat del Vallès (ES)

( * ) Notice: Subject to any disclaimer, the term of this patent is extended or adjusted under 35 U.S.C. 154(b) by 172 days.

(21) Appl. No.: 16/606,947

(22) PCT Filed: Apr. 20, 2018

(86) PCT No.: PCT/ES2018/070321
§ 371 (c)(1),
(2) Date: Oct. 21, 2019

(87) PCT Pub. No.: WO2018/193147
PCT Pub. Date: Oct. 25, 2018

(65) Prior Publication Data
US 2020/0379273 A1 Dec. 3, 2020

(30) Foreign Application Priority Data
Apr. 21, 2017 (ES) .................. ES201730634

(51) Int. Cl.
*G02C 7/02* (2006.01)
*G02C 7/06* (2006.01)
(52) U.S. Cl.
CPC ............. *G02C 7/028* (2013.01); *G02C 7/027* (2013.01); *G02C 7/061* (2013.01)

(58) Field of Classification Search
CPC .......... G02C 7/028; G02C 7/02; G02C 7/024; G02C 7/027; G02C 7/06; G02C 7/061; G02C 7/063
(Continued)

(56) References Cited

U.S. PATENT DOCUMENTS 6,655,803 B1 12/2003 Rubinstein et al.
2011/0208493 A1 8/2011 Altheimer et al.
(Continued)

FOREIGN PATENT DOCUMENTS

WO 2014137950 A1 9/2014

OTHER PUBLICATIONS

Mark Nicholson, How to Design Progressive Lenses, https://my.zemax.com/en-US/Knowledge-Base/kb-article/?ka=KA-01409, Abstract, Oct. 22, 2019.
(Continued)

*Primary Examiner* — Jordan M Schwartz
(74) *Attorney, Agent, or Firm* — Brooks Kushman P.C.

(57) ABSTRACT

A method for optimising a progressive ophthalmic lens and to a method for producing same. Further disclosed it a method for optimising a progressive ophthalmic lens the distribution of power and undesired astigmatism along an optical surface is optimised by minimising the function:

$$F := \sum_{i=1}^{n} w1_i (Ast_i)^2 + w2_i (Pow_i - TargetPow)^2$$

wherein $w1_i$ and $w2_i$ are 0 or positive, and wherein the subscript i indicates the different points of the optical surface. Summation additionally comprises a term from the group formed by (Continued)

$$w4m_i \cdot \left(\frac{\partial Ast_i}{\partial x}\right)^m, w5m_i \cdot \left(\frac{\partial Ast_i}{\partial y}\right)^m, w6m_i \cdot \left(\frac{\partial Pow_i}{\partial x}\right)^m, w7m_i \cdot \left(\frac{\partial Pow_i}{\partial y}\right)^m$$

and multiplications thereof,
m being greater than or equal to 1,
and $w4m_i$, $w5m_i$, $w6m_i$ and $w7m_i$ being greater than or equal to 0,
wherein if any of the terms of the group formed by $$\left(\frac{\partial Ast_i}{\partial x}\right)^m, \left(\frac{\partial Ast_i}{\partial y}\right)^m, \left(\frac{\partial Pow_i}{\partial x}\right)^m, \left(\frac{\partial Pow_i}{\partial y}\right)^m$$

and multiplications thereof is less than 0, then same is substituted by the absolute value thereof, and wherein, if m=2 and $w42_i = w52_i$, neither being 0, then summation additionally includes at least one other term from the group.

24 Claims, 31 Drawing Sheets

(58) Field of Classification Search
USPC .......................... 351/159.06, 159.42, 159.74
See application file for complete search history.

(56) References Cited

U.S. PATENT DOCUMENTS

| | | | | |
|---|---|---|---|---|
| 2013/0027657 | A1* | 1/2013 | Esser | G02C 7/024 |
| | | | | 351/41 |
| 2014/0049747 | A1* | 2/2014 | Altheimer | G02C 7/028 |
| | | | | 351/159.76 |
| 2017/0363883 | A1* | 12/2017 | Fricker | G02C 7/061 |
| 2018/0042474 | A1* | 2/2018 | Marcos | G02C 7/063 |
| 2019/0171035 | A1* | 6/2019 | Spratt | G02C 7/028 |

OTHER PUBLICATIONS

Mark Nicholson, How to Design Progressive Lenses, https://www.zemax.com/os/resources/learn/knowledgebase/how-to-design-progressive-lenses, Summary, Feb. 11, 2016.
Darryl J. Meister, et al., OPTOMETRY, Clinical and Experimental, Progress in the Spectacle Correction of Presbyopia. Part 1: Design and Development of Progressive Lenses, May 3, 2008, pp. 240-250.
Zemax, Engineer the future of Optics, Leading Optical Product Design Software for Engineering Teams—Zemax, Oct. 22, 2019.
Oficina Espanola De Patentes Y Marcas, International Search Report for International Application No. PCT/ES2018/070321, dated Aug. 21, 2018.
English Translation of the Written Opinion of the International Searching Authority for International Application No. PCT/ES2018/070321, dated Aug. 21, 2018.
Minkwitz theorem (G. Minkwitz. "Uber den Flachenastigmatismus bei gewissen symmetrischen Aspharen", Optica Acta. 10(3):2223-227. 1963 , including English Translation.

* cited by examiner

α=0°

α= 15°

METHOD FOR OPTIMISING A PROGRESSIVE OPHTHALMIC LENS AND METHOD FOR PRODUCING SAME

CROSS-REFERENCE TO RELATED APPLICATION

This application is the U.S. national phase of PCT Application No. PCT/ES2018/070321 filed on Apr. 20, 2018, which claims priority to ES Patent Application No. P201730634 filed on Apr. 21, 2017, the disclosures of which are incorporated in their entirety by reference herein.

FIELD OF THE INVENTION

The invention relates to a method for optimising a progressive ophthalmic lens in which the distribution of power and undesired astigmatism along an optical surface is optimised by minimising the function F:

$$F := \sum_{i=1}^{n} w1_i (Ast_i)^2 + w2_i (Pow_i - TargetPow)^2$$

wherein weights $w1_i$ and $w2_i$ can be 0 or have any positive value, and wherein the subscript i indicates the different points of the surface of the lens.

The invention also relates to a method for producing a lens.

STATE OF THE ART

Progressive ophthalmic lenses have an upper zone with distance vision power gradient, another lower zone with near vision power gradient, and an intermediate zone with a power gradient that gradually varies. The near zone is stronger than the distance zone, and the difference in power between the near and distance power gradient is the addition. The design of these lenses generally tries to obtain the smoothest possible transition between the distance power and the near power.

According to the Minkwitz theorem (G. Minkwitz. "Uber den Flachenastigmatismus bei gewissen symmetrischen Aspharen", Optica Acta. 10(3):2223-227. 1963), due to the continuous variation of power, there are always undesired lateral aberrations in the form of astigmatism. The design of the progressive lenses tries to minimise undesired astigmatism by placing it such that it causes the smallest possible disturbance when looking through the lens.

Up until now, reference to astigmatism has always meant undesired astigmatism, that is, undesired aberrations occurring due to the variation of power (according to the Minkwitz theorem). Nevertheless, there is another type of astigmatism, i.e. prescription astigmatism, which a progressive lens user may have. In this case, the user of progressive lenses with prescription astigmatism will require lenses with astigmatism according to the prescription, which will furthermore be combined with levels of undesired lateral astigmatism.

Various forms of undesired aberrations depending on the design type are described in the state of the art.

For example, the document by Meister D. J., Fisher S. W. "Progress in the spectacle power gradient of presbyopia. Part 1: Design and development of progressive lenses." Clinical and Experimental Optometry. 2008; 91:3:240-250. Carl Zeiss Vision, indicates that there are "long" or "short" designs, depending on the corridor length; there can also be also can "harder" or "softer" designs, depending on the extent of the distance and near zones that are free of undesired astigmatism. There can also be specific progressive lens designs according to the intended use of the progressive lens, for example, for office use, driving, or playing sports; a progressive lens with the near or distance zone being larger or smaller would be of interest. Depending on the features of these designs, lateral astigmatisms will be smaller or larger. For example, for outdoor activities or activities with dynamic needs, distance vision zones are often larger, whereas for activities that require greater use of the near zone, these lenses will have a larger near zone than conventional progressive lenses.

In general, the distribution of undesired astigmatism may vary, not being zero in the "free" zones or where the power and astigmatism are not so strictly controlled (see reference in standard ISO 8980-2 of the distance vision, near vision and intermediate vision zone). The manner in which this astigmatism is distributed can be an indirect consequence of other optimisation parameters or can be the direct consequence of certain lens design criteria.

There are some commercial programmes for progressive lens design (for example, Zemax software, see https://www.zemax.com/, also see Mark Nicholson: How to Design Progressive Lenses. Jul. 31, 2006, (see "htts://www.zemax.com/os/resources/learn/knowledgebase/how-to-design-progressive-lenses"). By using these programmes, it is possible to make "softer" or "harder" designs with shorter or longer corridors, and with different lateral astigmatism distributions. These lateral astigmatism distributions can be harder or softer, but they do not take into account in any case undesired astigmatism distribution criteria based on the directional derivative (or orientation) of the astigmatism.

In general, however, each progressive lens company has its own method for designing progressive lenses and has developed its own tools.

There is no public information about what these non-commercial progressive lens design programmes of competing companies are like, but the progressive lenses available on the market are known to have very symmetrical astigmatism profiles with respect to the vertical axis, with the exception of the zone of the inset (or lateral shift of the near zone to track the movement of the eye during near vision or accommodation).

As described in the aforementioned Meister document, the progressive lenses are as symmetrical as possible to achieve better binocularity of the user. The first progressive lenses were rotated 9 degrees for the purpose of achieving the near inset for the right eye and the left eye from a single blank. Then attempts were made to come up with designs with an inset, which involved a higher level of nasal astigmatism than the level of temporal astigmatism. Then attempts were made to balance levels of astigmatism so that they were the same (nasal and temporal) for one and the same distance from the vertical axis. That was an attempt to improve binocular vision. Finally, with the position of wear, a different inset is chosen depending on the base of the lens and the power gradient of the user. It also advises minimising undesired astigmatism vertically, or at 45 degrees (p. 248, columns 1 and 2). These recommendations, however, are for minimising the magnification or "skew distortion" and only take into account the magnitude (and location) of the astigmatism, but not the value of its gradient or the orientation thereof. It is also indicated that the blending of the distance, near and intermediate zones "is achieved by incorporating a certain amount of surface astigmatism or cylinder, generally oriented at an oblique axis, in the lateral regions of the lens surface". In this document, reference to an oblique angle is understood to mean that the lens presents symmetry with respect to the vertical axis of the lens with the exception of the inset (see FIG. 31).

The effect which produces a high gradient of undesired astigmatism is known to be what bothers users the most, such that the strategy progressive lens designers follow is usually to move aberrations as far away as possible from of the distance vision zone, near vision zone and (to the extent possible) from the narrow corridor joining both zones.

Moreover, methods for calculating progressive lenses using numerical optimisation methods combined with the finite element method are known in the state of the art. Said methods are cited in the mentioned Meister document. The surface of the lens can be modelled with a b-spline, and a point mesh, and certain conditions are imposed on the points of the mesh. The power error, the undesired astigmatism and the modulus of the astigmatism gradient are also minimised. Each of these three values can be multiplied by a different weight function. Therefore, according to the state of the art, a function to be minimised can be:

$$\sum_{i=1}^{n} w1_i(Ast_i)^2 + w2_i(Pow_i - TargetPow)^2 + w3_i(Astgrad)^2 \quad \text{[formula 0]}$$

wherein $$w1_i \geq 0, w2_i \geq 0, w3_i \geq 0$$

wherein the squared astigmatism gradient is:

$$Astgrad^2 = \left(\frac{\partial Ast_i}{\partial x}\right)^2 + \left(\frac{\partial Ast_i}{\partial y}\right)^2$$

$w1_i$, $w2_i$ and $w3_i$ are three different weight functions which can take any positive value and points i=1 . . . n are points of the mesh of the surface of the progressive lens to be calculated.

DESCRIPTION OF THE INVENTION

The object of the invention is to overcome these drawbacks. This objective is sought by means of a method for optimisation of the type indicated above, characterised in that summation additionally comprises at least one term from the group formed by $$w4m_i \cdot \left(\frac{\partial Ast_i}{\partial x}\right)^m, w5m_i \cdot \left(\frac{\partial Ast_i}{\partial y}\right)^m, w6m_i \cdot \left(\frac{\partial Pow_i}{\partial x}\right)^m, w7m_i \cdot \left(\frac{\partial Pow_i}{\partial y}\right)^m$$

and multiplications thereof,
m being greater than or equal to 1,
and the weights $w4m_i$, $w5m_i$, $w6m_i$ and $w7m_i$ being able to have any value greater than or equal to 0,
wherein if any of the terms of the group formed by $$\left(\frac{\partial Ast_i}{\partial x}\right)^m, \left(\frac{\partial Ast_i}{\partial y}\right)^m, \left(\frac{\partial Pow_i}{\partial x}\right)^m, \left(\frac{\partial Pow_i}{\partial y}\right)^m$$

and multiplications thereof is less than 0, then same is substituted by the absolute value thereof,
and wherein if m=2 and $w42_i = w52_i$, neither being 0, then summation additionally comprises at least one other term from said group.

The nomenclature used in the present description and claims is generally the following:
Ast refers to the undesired astigmatism function of the final lens,
Pow refers to the power function of the final lens,
TargetPow refers to the desired distribution of power (the prescription power taking the addition into account),
$w4m_i$ is the coefficient accompanying the derivative according to the x-axis of the undesired astigmatism function,
$w5m_i$ is the coefficient accompanying the derivative according to the y-axis of the undesired astigmatism function,
$w6m_i$ is the coefficient accompanying the derivative according to the x-axis of the power function of the final lens,
$w7m_i$ is the coefficient accompanying the derivative according to the y-axis of the power function of the final lens.

As can be seen, in the state of the art the function to be minimised takes into account the values of the undesired astigmatism function and/or the values of the difference between the final power of the lens and the prescription power function. In some cases, the values of the gradient of the undesired astigmatism function are also taken into account, but only taking its absolute value into account. However, the undesired astigmatism function is a two-dimensional function, and it has been seen in the present invention that it is possible to optimise the surface of the lens taking this fact into account, based on including in the function to be minimised other terms relating to the variation (that is, the directional derivative) of the values of the astigmatism which, however, are not exclusively the modulus thereof. The same applies to the final power function of the lens, in respect of which its spatial variations (that is, the directional derivatives) have never been taken into account in minimisation formulas.

In the methods used up until now by the applicant, minimisation of the summation of astigmatism and of the absolute value (or modulus) of the astigmatism gradient have been taken into account. With the new invention, other components to be minimised are now intended to be introduced, such as the vertical component of the astigmatism gradient and/or the horizontal component of the gradient with different weights (up until now they always had the same weight). The directional derivative of the astigmatism in a given direction is also intended to be minimised. In a more general manner, this method is also applicable to optimisation of the distribution of optical power gradients of the lenses or to combinations of power and astigmatism.

In the results section, it can be seen that the progressive lenses obtained by applying minimisation of the directional derivative of the power or astigmatism gradient are not symmetrical with respect to the y-axis (x=0), even taking into account the shift of the near zone (inset), and therefore these lenses differ from those which are currently present on the market.

A new concept of oblique astigmatism which does not maintain symmetry with respect to the vertical axis is thus introduced. The oblique angle referred to in the aforementioned Meister document does maintain symmetry with respect to the vertical axis. It is worth pointing out that, as a consequence of the G. Minkwitz theorem, lenses with the longest corridor have a lower level of lateral astigmatism.

Advantageously, summation additionally comprises the following terms:

$$w42_i \cdot \left(\frac{\partial Ast_i}{\partial x}\right)^2,$$

$$w52_i \cdot \left(\frac{\partial Ast_i}{\partial y}\right)^2, \text{ and}$$

$$2 \cdot w41_i \cdot w51_i \cdot \left(\frac{\partial Ast_i}{\partial x}\right) \cdot \left(\frac{\partial Ast_i}{\partial y}\right),$$

and it is particularly advantageous that:
$w42_i = \cos^2(\text{alpha})$,
$w52_i = \sin^2(\text{alpha})$, and
$w41_i * w51_i = \cos(\text{alpha})*\sin(\text{alpha})$,
wherein alpha is the angle formed by the direction in which the gradient of the undesired astigmatism with the horizontal axis is to be minimised.

Another preferred solution is when summation additionally comprises the following terms:
$(w41_i*(dAst_i/dx)+w51_i*(dAst_i/dy))^p$, wherein p is positive and even.

Another preferred solution is when summation additionally comprises the following terms:

$$|w41_i*(dAst_i/dx)+w51_i*(dAst_i/dy)|$$

Another preferred solution is when summation additionally comprises the following terms:
$\cos^2(\text{alpha})*(dAst_i/dx)^2$, and
$\sin^2(\text{alpha})*(dAst_i/dy)^2$ Another preferred solution is when summation additionally comprises the following terms:
$\cos^2(\text{alpha})*(dPow_i/dx)^2$, and
$\sin^2(\text{alpha})*(dPow_i/dy)^2$ Another preferred solution is when summation additionally comprises the following terms:
$(w61_i*(dPow_i/dx)+w71_i*(dPow_i/dy))^p$, wherein p is positive and even.

Another preferred solution is when summation additionally comprises the following terms:

$$|w61_i*(dPow_i/dx)+w71_i*(dPow_i/dy)|$$

Depending on the value of the alpha angle, various preferred solutions can be obtained:
- when alpha is the angle of the prescription astigmatism,
- when alpha is the angle of the inset, or the angle of the inset +90 or the angle of the inset +45,
- when alpha is 0,
- when alpha is 90.

Preferably, alpha is selected depending on the visual map of the user (that is, depending on a scanning frequency recording in the plane or pattern of sight of the user).

Advantageously, the optical surface is divided into several different zones and alpha is selected independently in each of them, being independently minimised.

Another preferred solution is when alpha is selected depending on an element of the position of wear of the eyeglass frame on the face of the user, where said element is preferably an element from the group of elements formed by the monocular distance, the vertex distance, the pantoscopic angle at the setup height and combinations thereof.

Advantageously, the weights $w4m_i$, $w5m_i$, $w6m_i$ and/or $w7m_i$ are multiplied by a value C which is related to the value of the prescription cylinder, such that it weights $w4m_i$, $w5m_i$, $w6m_i$ and/or $w7m_i$, giving a higher value to the weight the higher the absolute value of the cylinder is. In this sense, it is particularly advantageous that C assumes the following values:
C=1 if the value of the prescription cylinder is less than or equal to 1 dioptre, and
C=|Cyl| if the absolute value of the prescription cylinder is greater than 1 dioptre.

Moreover, likewise preferred solutions are those in which alpha assumes any value according to any of the previously indicated strategies except for the case in which it assumes the value 0 and/or 90.

Advantageously, optimisation is carried out with iterative, numerical or analytical methods, preferably numerical methods, with or without restrictions.

Another object of the invention is a method for producing a progressive ophthalmic lens, characterised in that it comprises a method for optimisation according to the invention and a step for machining the optimised optical surface.

BRIEF DESCRIPTION OF THE DRAWINGS

Other advantages and features of the invention will become apparent from the following description, in which preferred embodiments of the invention are described in reference to the attached drawings in a non-limiting manner. In the drawings.

DETAILED DESCRIPTION OF EMBODIMENTS OF THE INVENTION

Figure 1:
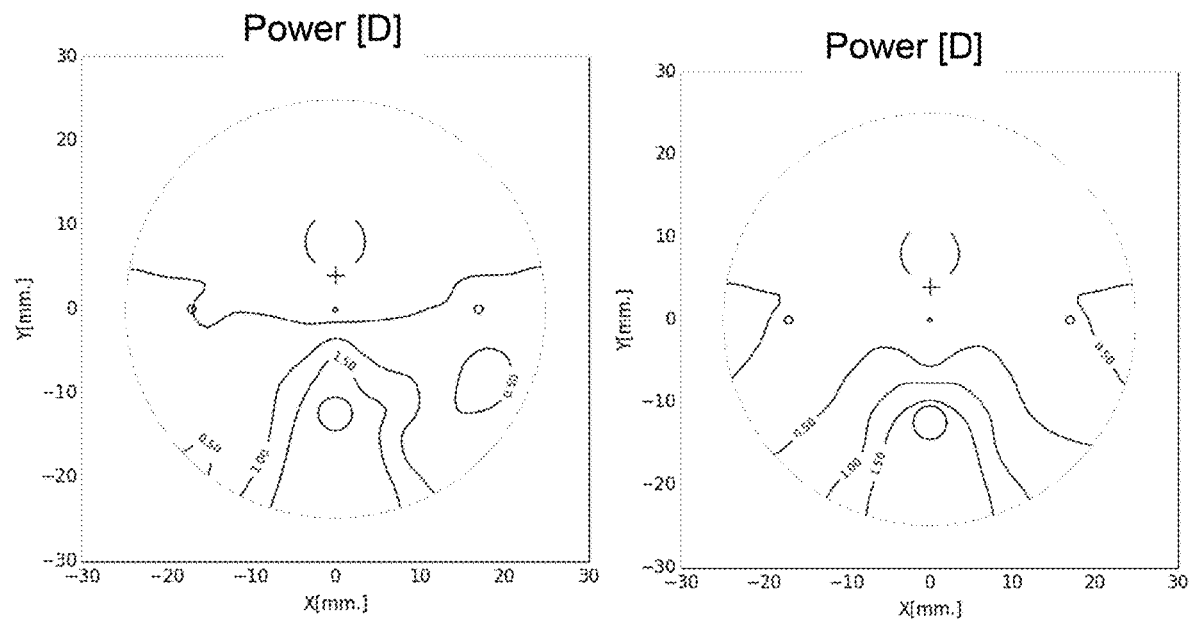
FIG. 1 shows a power map with minimisation of the target function by α=45 using formula 1 (left) and formula 2 (right).

One of the objectives of the new method for optimising or designing progressive lenses is to propose a new innovative way to minimise the astigmatism gradient in a given direction, or on a given axis.

Preferred Embodiment 1

A new target function which takes into account minimisation of the astigmatism gradient according to a chosen generic direction, at a degrees with respect to the x-axis, is desired. According to this first preferred embodiment of the invention, it is necessary to add to function F a term of the following type:

$$w3_i \left( \cos(\alpha) \cdot \frac{\partial Ast_i}{\partial x} + \sin(\alpha) \cdot \frac{\partial Ast_i}{\partial y} \right)^2 \quad \text{[formula 1]}$$

wherein $w3_i$≥0

Preferably, $w3_i$ is always greater than $w1_i$ and $w2_i$. It is likewise advantageous to enable weighting wa depending on the value of the prescription astigmatism (C, or cylinder) such that, when the prescription astigmatism is higher, this component will be stronger in the optimisation. That is, the term to be added is of the following type:

$$C * w3_i, \left( \cos(\alpha) \cdot \frac{\partial Ast_i}{\partial x} + \sin(\alpha) \cdot \frac{\partial Ast_i}{\partial y} \right)^2 \quad \text{[formula 1C]}$$

wherein C≥0, $w3_i$≥0.

Actually, in many cases $w2_i$ (and perhaps also $w1_i$) will preferably be 0, and through optimisation with restrictions, target power and astigmatism values for certain zones of the lens are introduced.

For example, this value C which would multiply the function of weight $w3_i$, would take value 1 when the prescription astigmatism is equal to or less than 1 dioptre, and between 1 and 5 according to the value of C when the latter is greater than 1 dioptre.

Preferred Embodiment 2

In another preferred embodiment of the invention, the term to be added in the function F would be a "symmetric" variant with respect to the y-axis:

$$w3_i \left( \cos^2(\alpha) \cdot \left( \frac{\partial Ast_i}{\partial x} \right)^2 + \sin^2(\alpha) \cdot \left( \frac{\partial Ast_i}{\partial y} \right)^2 \right) \quad \text{[formula 2]}$$

wherein $w3_i$>=0.

Likewise, in this second case, the two other components of the target function can be similar, but preferably, as in the previous case, with lower weights. It is also advantageous to weight $w3_i$ depending on the value of the prescription astigmatism as in the case of formula [1C] above.

For formula 2, $\alpha \neq 45°$, $\alpha \neq 135°$ is considered, since if $\alpha=45°$ or $\alpha=135°$, formula 2 is equal to the last component of formula 0.

In general, for formula 1 it makes sense to consider $0° \leq \alpha \leq 180°$ and for formula 2 it makes sense to consider $0° \leq \alpha \leq 90°$, since with other angles outside of these intervals the same lenses would be obtained as the lenses obtained with alpha within these intervals.

Preferred Embodiment 3

The following formula 3 shows another preferred embodiment of the invention. Particular weightings are introduced therein according to whether greater importance is to be given to the minimisation of the horizontal or vertical astigmatism gradient:

$$w3_i \left( \text{weight1} \cdot \left( \frac{\partial Ast_i}{\partial x} \right)^2 + \text{weight2} \cdot \left( \frac{\partial Ast_i}{\partial y} \right)^2 \right) \quad \text{[formula 3]}$$

wherein $w3_i >= 0$, weight1$\geq 0$, weight2$\geq 0$
wherein weight1 and weight2 are larger or smaller according to whether greater importance is to be given to the minimisation of the horizontal or vertical astigmatism gradient.

Example 1

Comparison of power and astigmatism maps of a progressive lens obtained with minimisation of the target function with an angle of $\alpha=45$ using formula 1 and another lens obtained with formula 2 (or 3) for the case in which
For formula 1: w1=0, w2=0, w3=1, weight1="cos(45)", weight2="sin(45)"
For formula 2: w1=0, w2=0, w3=1, C=1, weight1=cos(45)*cos(45), weight2=sin(45)*sin(45); given that cos(45)=sin(45), weight1=weight2

Case of a distance vision neutral lens, without cylinder and with addition of 2 dioptres (for a refractive index of 1.6): optimisations yield distributions of power according to the maps of FIG. 1.

It can be seen that the power maps are similar, but not identical. The astigmatism maps obtained in the case with minimisation of the target function by $\alpha=45$ using formula 1 is substantially different from formula 2 (see FIG. 2).

Figure 2:
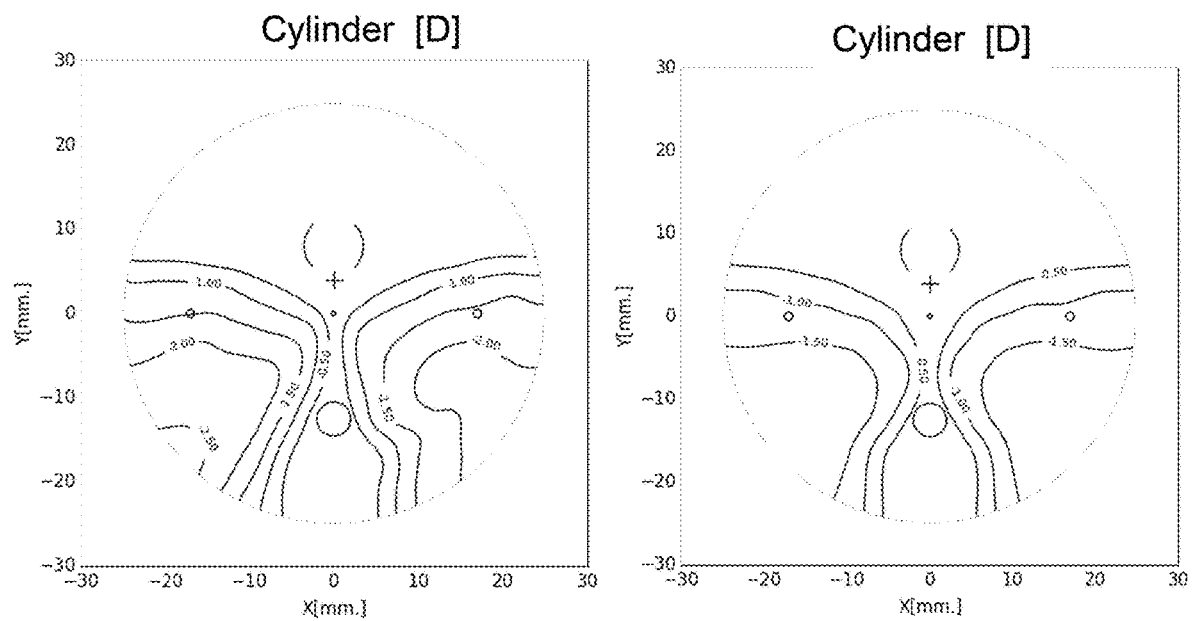
FIG. 2 shows an astigmatism map with minimisation of the target function by α=45 using formula 1 (left) and formula 2 (right).

It can be seen in the plot of FIG. 2 (left) that there is a clear orientation of the distribution of astigmatism in the lateral zone. An asymmetric orientation of the astigmatism is clearly obtained with formula 1, whereas this distribution is more symmetric with respect to the y-axis (x=0) with formula 2.

To better understand the examples, lenses without a shift of the addition in the nasal direction, that is, with an inset of 0 mm or, in other words, without inset, have been considered.

Example 2

Comparison of minimisation of the target function by $\alpha=135$ using formula 1 and formula 2 for the case in which:
For formula 1: w1=0, w2=0, w3=1, C=1, weight1="cos(135)", weight2="sin(135)"
For formula 2: w1=0, w2=0, w3=1, C=1, weight1=cos(135)*cos(135), weight2=sin(135)*sin(135); given that cos(135)=−sin(135), weight1=weight2

Since $\cos^2(45)=\cos^2(135)=\sin^2(45)=\sin^2(135)$, and consequently formula 2 for $\alpha=45$ and $\alpha=135$ is exactly the same target function and therefore the same lens.

Using formula 2, the same design is obtained for $\alpha=45$ and $\alpha=135$. In contrast, using formula 1, different designs are obtained. That is, with formula 2 only angles of from 0 to 90 can be distinguished, whereas with formula 1 the angles of from 0 to 180 are distinguished.

Figure 3:
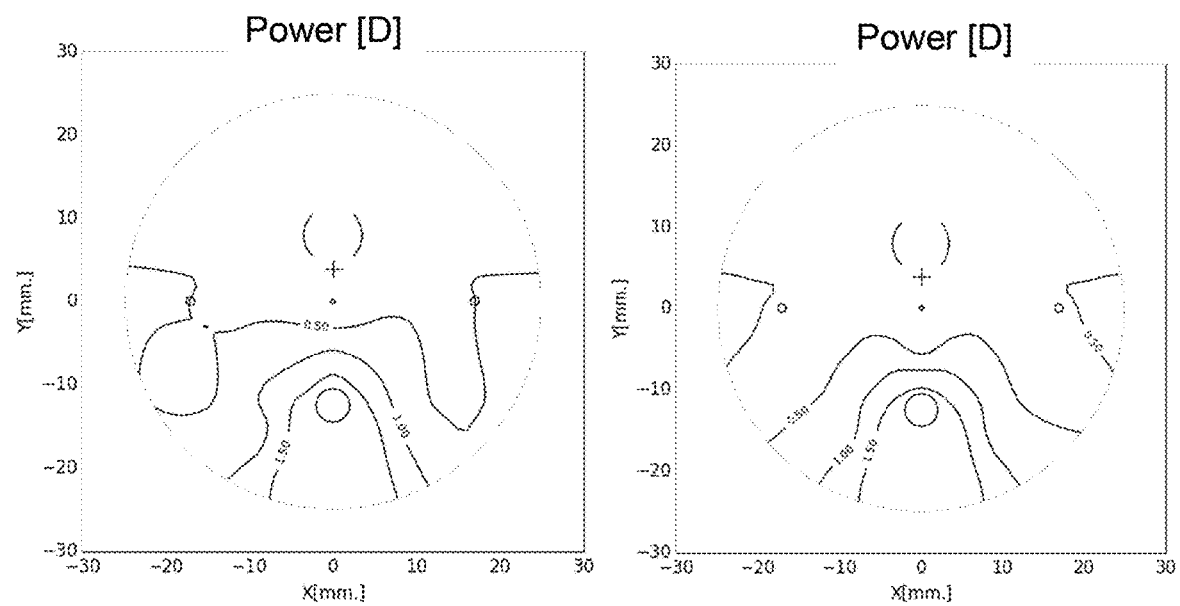
FIG. 3 shows a power map with minimisation of the target function by α=135 using formula 1 (left) and formula 2 (right).
Figure 4:
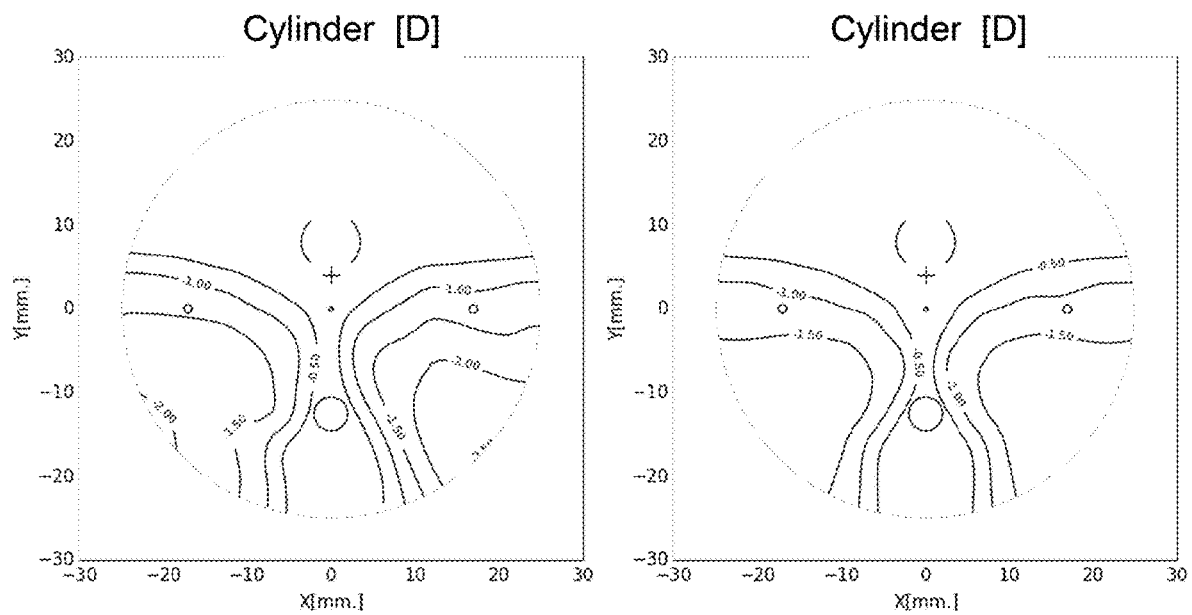
FIG. 4 shows an astigmatism map with minimisation of the target function by α=135 using formula 1 (left) and formula 2 (right).
Figure 5A:
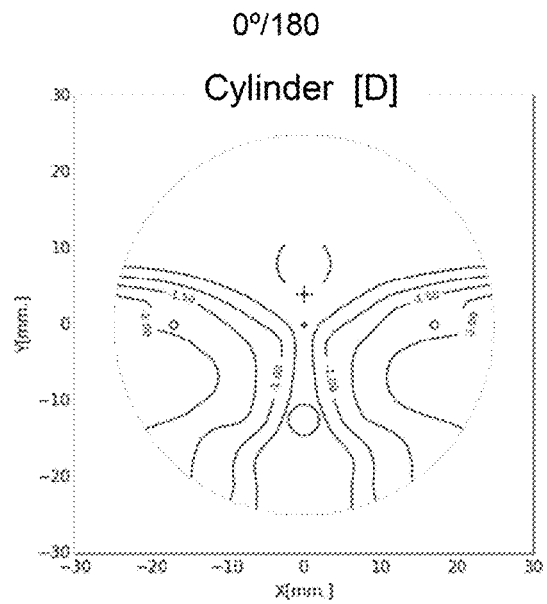
FIG. 5 shows an astigmatism map with minimisation of the target function by different degrees using formula 1.
Figure 5B:
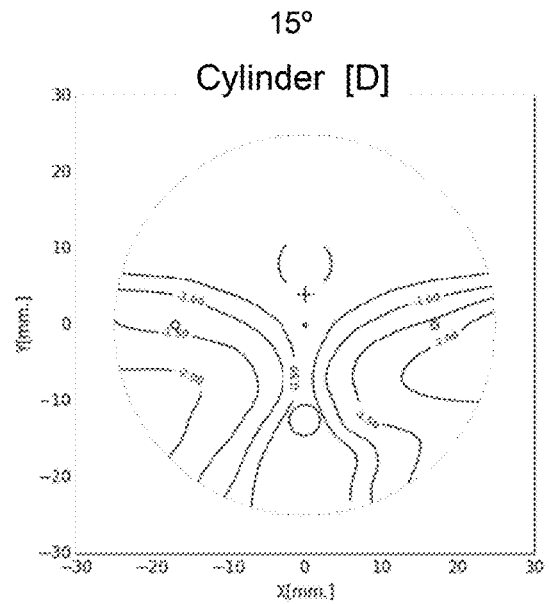
Figure 5C:
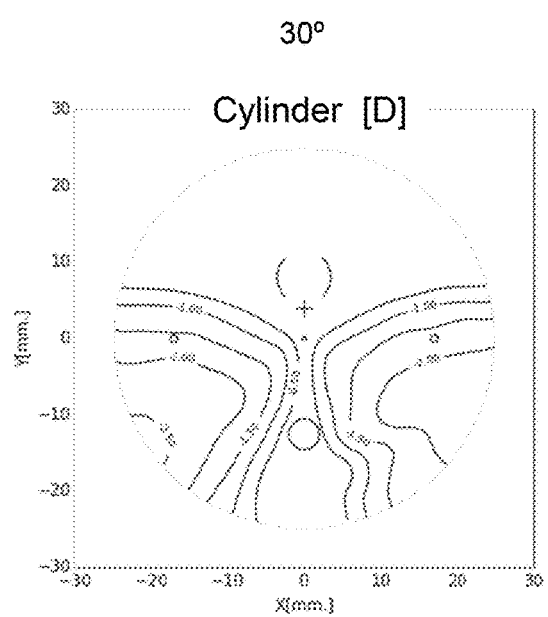
Figure 5D:
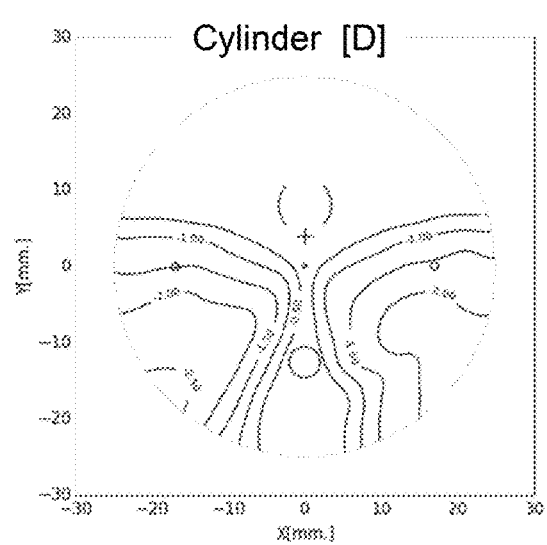
Figure 5E:
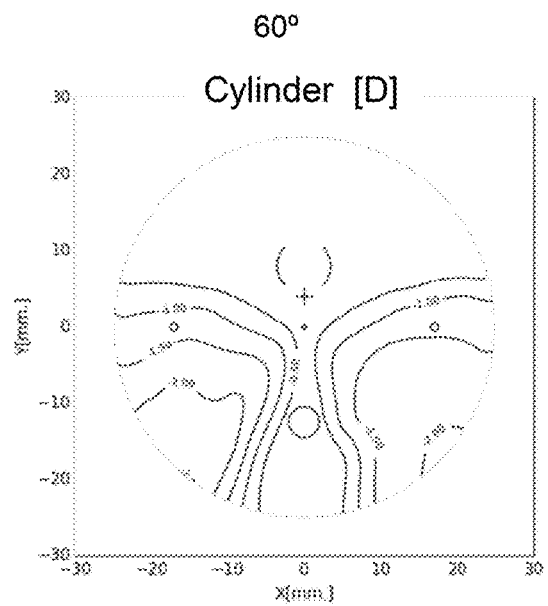
Figure 5F:
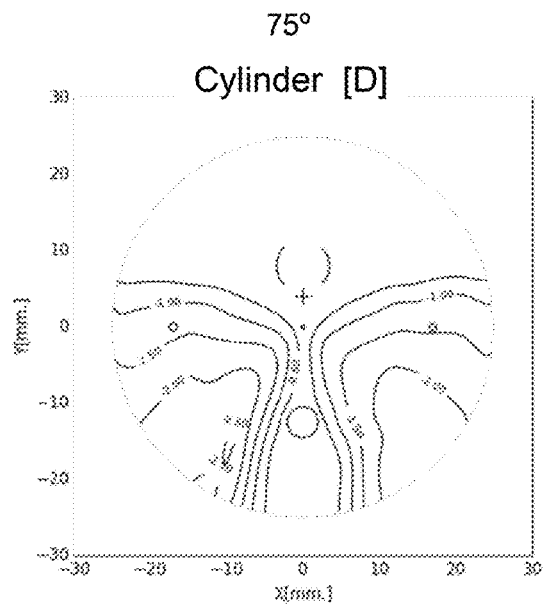
Figure 5G:
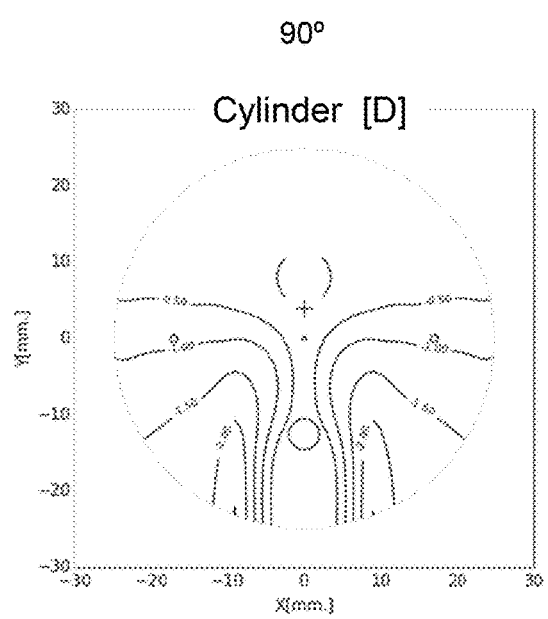
Figure 5H:
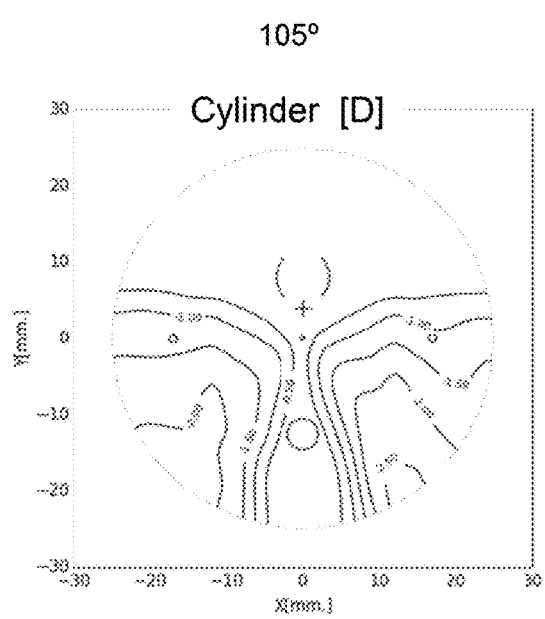
Figure 5I:
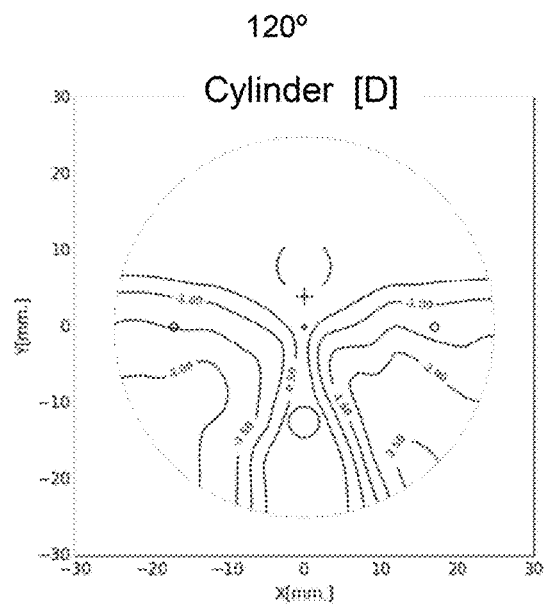
Figure 5J:
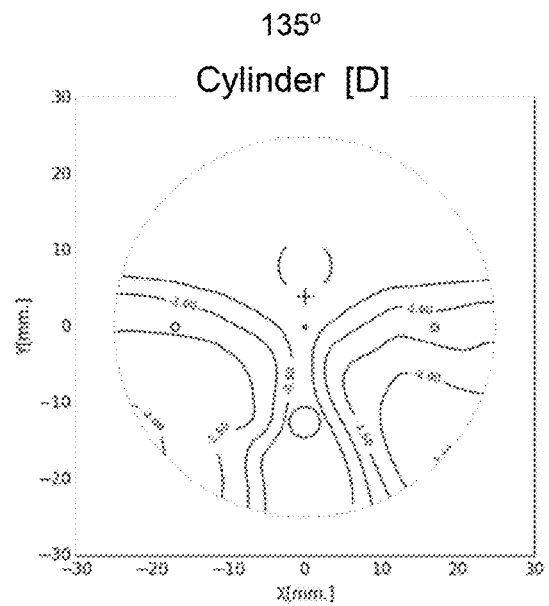
Figure 5K:
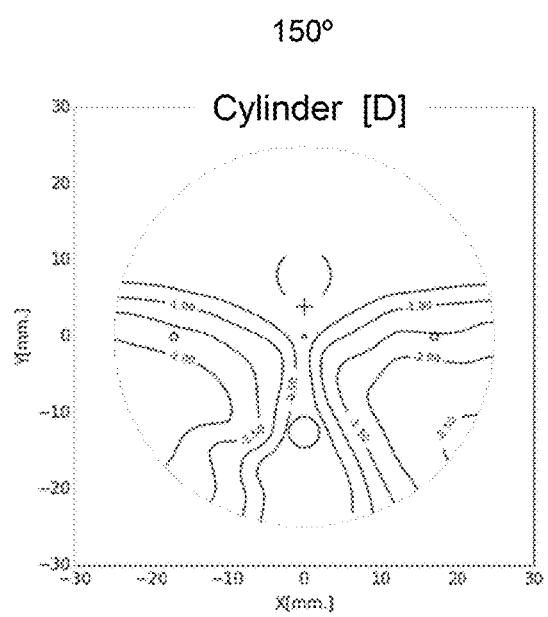
Figure 5L:
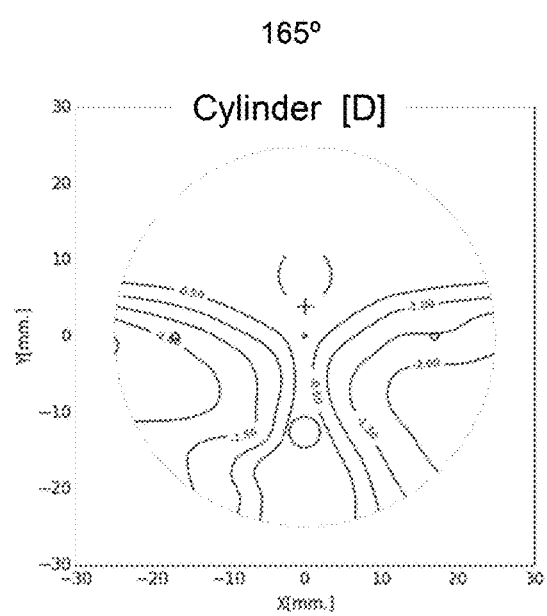
Figure 6A:
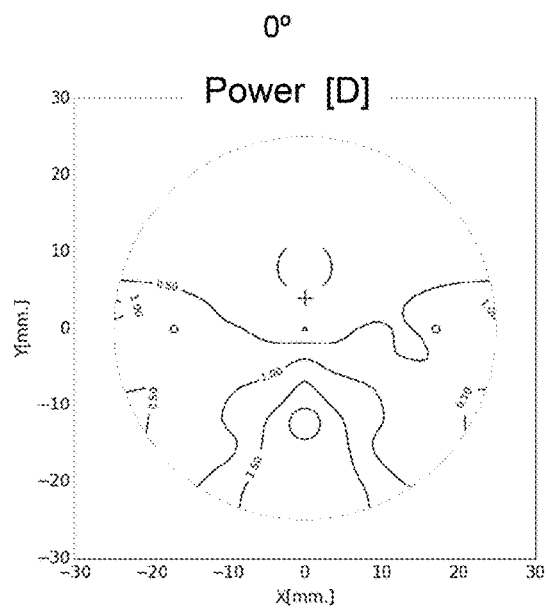
FIG. 6 shows a power map with minimisation of the target function by different degrees, α=0, α=30, α=60, α=90, using formula 2.
Figure 6B:
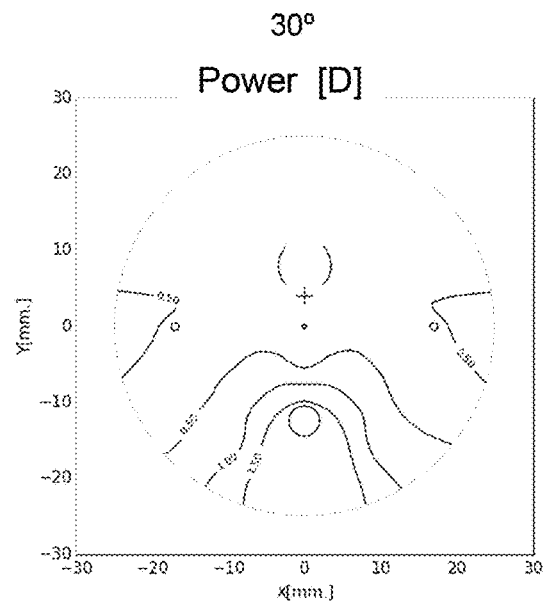
Figure 6C:
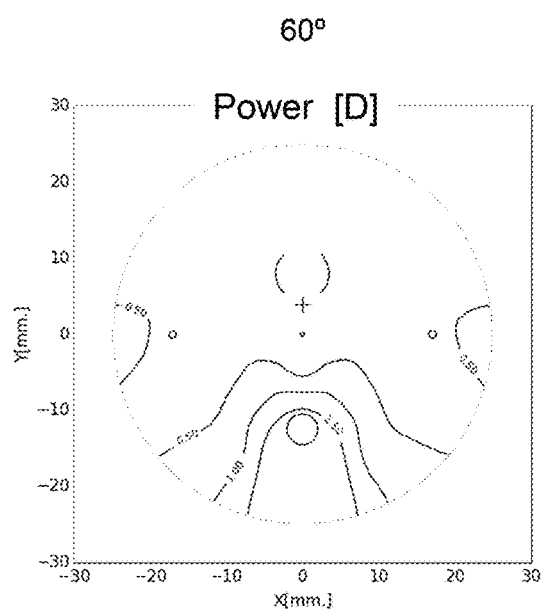
Figure 6D:
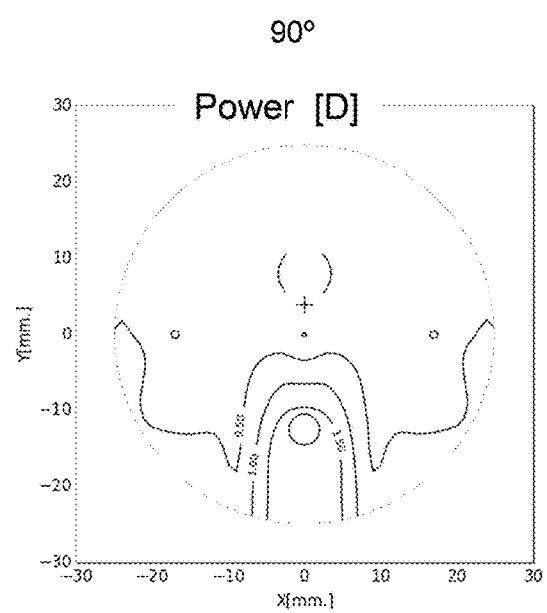
Figure 7A:
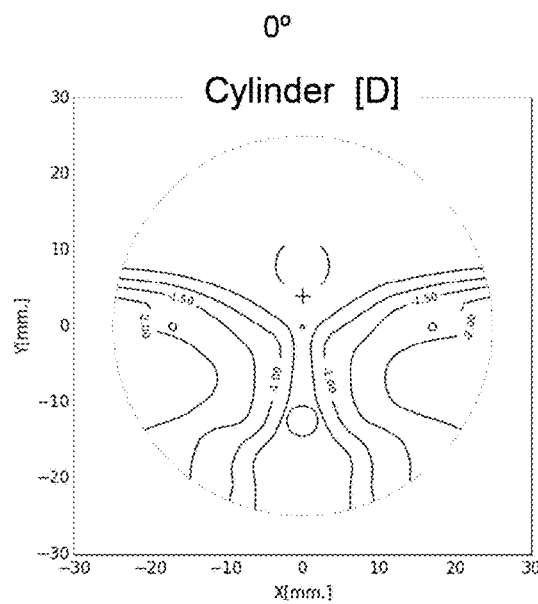
FIG. 7 shows an astigmatism map with minimisation of the target function by different degrees, α=0, α=30, α=60, α=90, using formula 2.
Figure 7B:
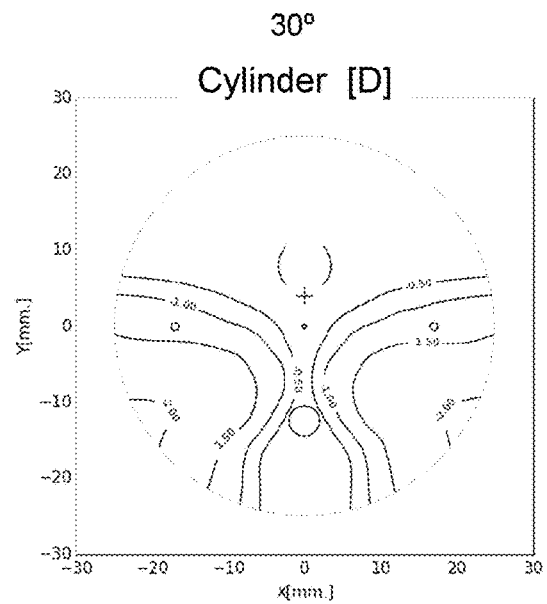
Figure 7C:
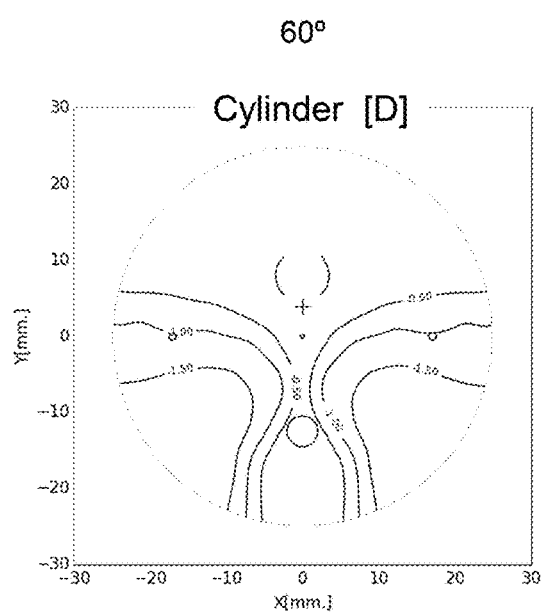
Figure 7D:
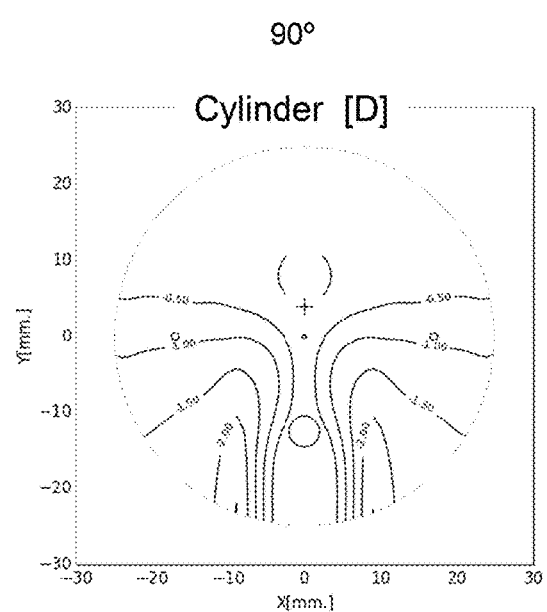
Figure 8A:
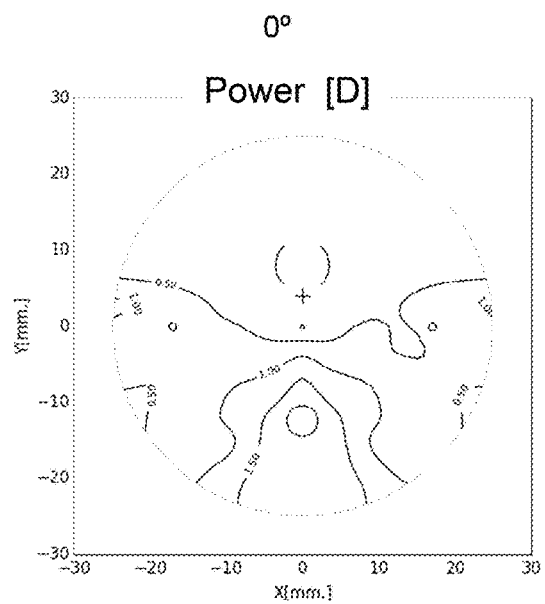
FIG. 8 shows a power map with minimisation of the target function by different degrees, α=0, α=30, α=60, α=90, using formula 4.
Figure 8B:
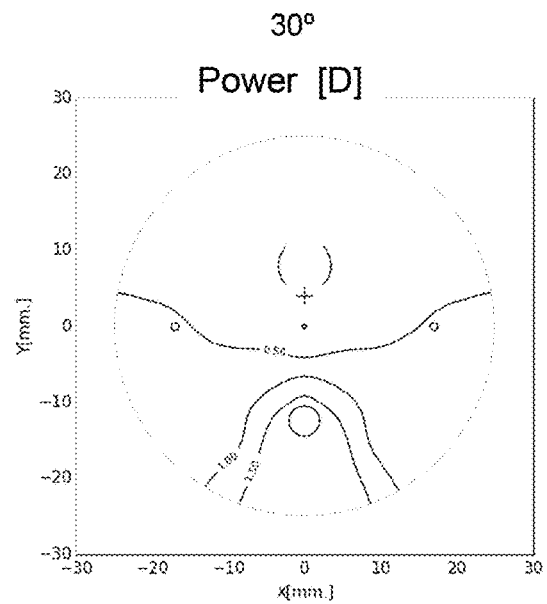
Figure 8C:
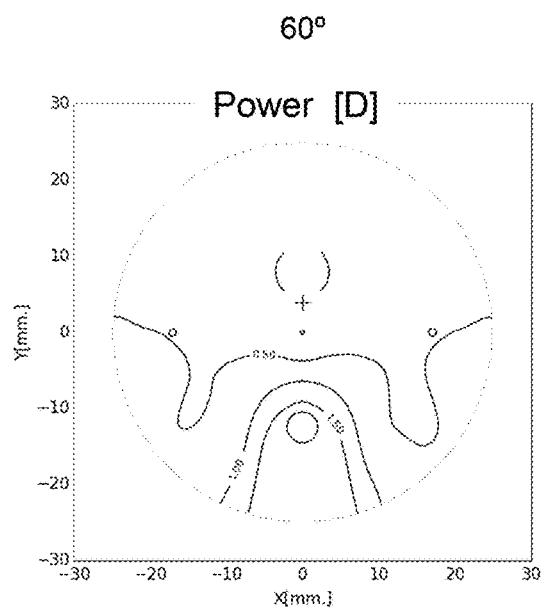
Figure 8D:
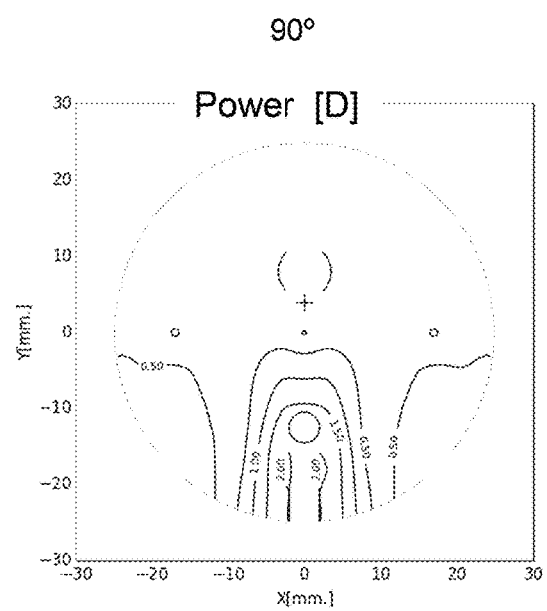
Figure 9A:
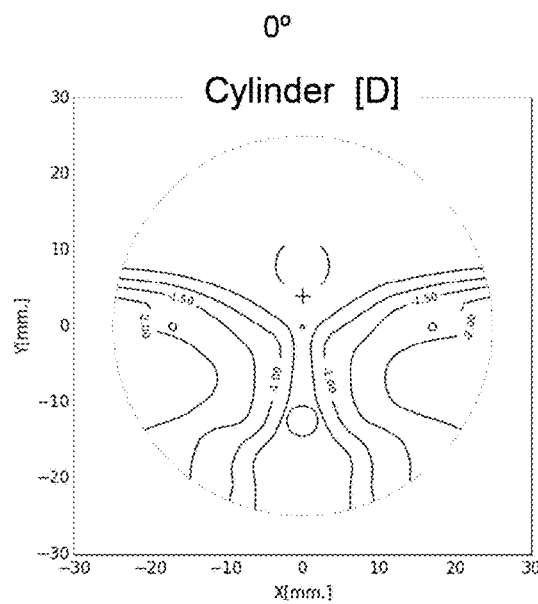
FIG. 9 shows an astigmatism map with minimisation of the target function by different degrees, α=0, α=30, α=60, α=90, using formula 4.
Figure 9B:
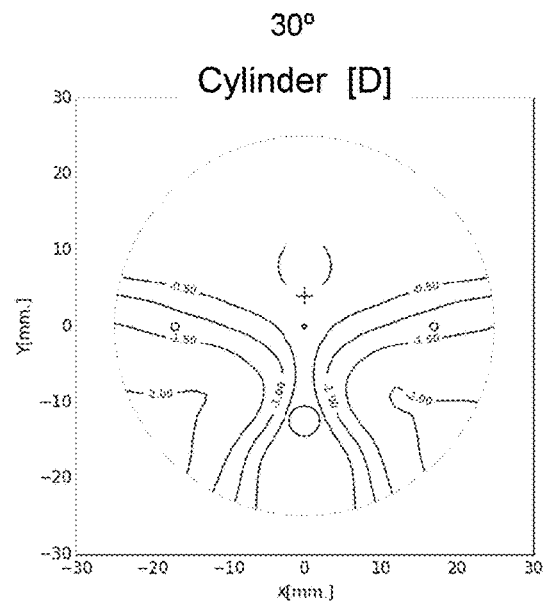
Figure 9C:
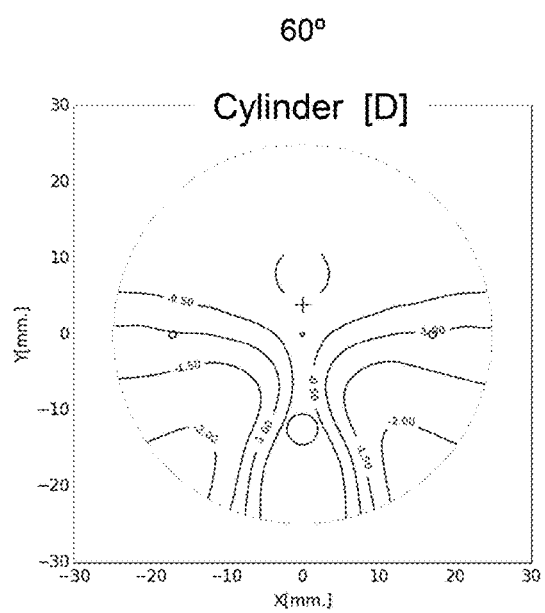
Figure 9D:
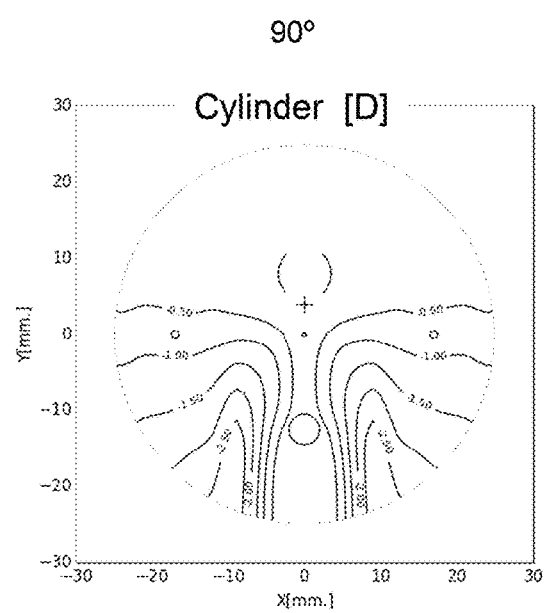

The obtained results are shown in FIGS. 3 and 4.

Preferred Embodiment 4

Instead of considering the astigmatism gradient, the power gradient, with the corresponding weights, can also be minimised. This aspect leads to considering formula 4:

$$w3_i \left( \cos^2(\alpha) \cdot \left( \frac{\partial Pow_i}{\partial x} \right)^2 + \sin^2(\alpha) \cdot \left( \frac{\partial Pow_i}{\partial y} \right)^2 \right) \quad \text{[formula 4]}$$

wherein $w3_i \geq 0$.
Formula 4 is the same as formula 2, but changing astigmatism for power.
Formula 5 can also be considered:

$$w3_i \left( \cos(\alpha) \cdot \frac{\partial Pow_i}{\partial x} + \sin(\alpha) \cdot \frac{\partial Pow_i}{\partial y} \right)^2 \quad \text{[formula 5]}$$

wherein $w3_i \geq 0$.
Formula 5 is the same as formula 1, but changing astigmatism for power.

For other considerations of the invention, formulas 1bis, 2bis, 4bis and 5bis, which are variants of formulas 1, 2, 4 and 5, wherein the angle $\alpha$ can depend on the zone or point of the lens, are considered.

$$w3_i \left( \cos(\alpha_i) \cdot \frac{\partial Ast_i}{\partial x} + \sin(\alpha_i) \cdot \frac{\partial Ast_i}{\partial y} \right)^2$$

wherein $w3_i \geq 0$ [formula 1bis]

$$w3_i \left( \cos^2(\alpha_i) \cdot \left( \frac{\partial Ast_i}{\partial x} \right)^2 + \sin^2(\alpha_i) \cdot \left( \frac{\partial Ast_i}{\partial y} \right)^2 \right)$$

wherein $w3_i \geq 0$ [formula 2bis]

$$w3_i \left( \cos^2(\alpha_i) \cdot \left( \frac{\partial Pow_i}{\partial x} \right)^2 + \sin^2(\alpha_i) \cdot \left( \frac{\partial Pow_i}{\partial y} \right)^2 \right)$$

wherein $w3_i \geq 0$ [formula 4bis]

$$w3_i \left( \cos(\alpha_i) \cdot \frac{\partial Pow_i}{\partial x} + \sin(\alpha_i) \cdot \frac{\partial Pow_i}{\partial y} \right)^2$$

wherein $w3_i \geq 0$ [formula 5bis]
It should be pointed out that the angle $\alpha_i$ depends on the point of the lens. It will be seen in the use examples that the angle $\alpha_i$ can be different at each point of the lens, or it can take different values depending on the zone of the lens.

Additional Examples

Examples Taking Formula 1 into Account

A certain prescription is considered (sphere=0D, addition 2D, cylinder 2D, axis 60), and a set of progressive lenses will be calculated based on the same prescription, but varying the angle of optimisation of the astigmatism gradient according to formula [1] from 0 to 180 in 15 intervals.

Using formula 1, cos(60) and sin(60) are considered. Values w1=0, w2=0, w3=3 and C=1 and starting power maps.

Astigmatism plots calculated for different angles from formula [1] from 0 to 180, in 15 intervals (see FIG. 5) are seen below. It can be seen that there is certain symmetry with respect to the vertical axis (15-165, 30-150, etc.)

Examples Taking Formula 2 into Account

Four examples using formula 2 and the following weights are considered, wherein w1=0, w2=0, w3=1, weight1=cos($\alpha$)*cos($\alpha$), weight2=sin($\alpha$)*sin($\alpha$) $\alpha$=0, $\alpha$=30, $\alpha$=60, $\alpha$=90

(See FIGS. 6 and 7)

Major differences can be observed for the astigmatism maps from the preceding example. As explained above, due to the symmetry of the formula, different examples are obtained for 0°≤$\alpha$≤90°. The examples obtained for 90°≤$\alpha$≤180° would be identical to the preceding examples.

It should be pointed out that the progressive lenses obtained in this example will be more or less suitable according to the activities the user performs. For reading activities, a progressive lens optimised according to formula 2 and $\alpha$=0 will be more comfortable. In contrast, for outdoor activities such as hiking, a progressive lens optimised according to formula 2 and $\alpha$=90 will be more comfortable. For driving, where both the distance zone and the near zone are important, the progressive lens with $\alpha$=30 will be suitable.

Obviously, for the development of occupational progressive lenses, in addition to modifying the target function, as is being patented in this document and shown in the examples, the size of the distance and near zones can be modified. The modification of the size of the near and distance zones can be combined with the modification of the target function.

Examples Taking Formula 4 into Account

Four examples using formula 4 and the same weights as in the preceding example are considered:

w1=0, w2=0, w3=1, weight1=cos($\alpha$)*cos($\alpha$), weight2=sin($\alpha$)*sin($\alpha$) $\alpha$=0, $\alpha$=30, $\alpha$=60, $\alpha$=90

The result obtained is somewhat similar to the result of the preceding example, but not identical (see FIGS. 8 and 9).

Likewise, as in the preceding example, these maps can be improved by considering other near and distance regions and by modifying the weights w1, w2 and w3.

One and the Same Example Taking Variants of Formulas 0, 1, 2 and 2Bis into Account:

The following examples have one and the same base design taking variants of formulas 0, 1, 2 and 2bis into account. In all of them, the base design is a progressive lens with an addition of 2 dioptres, an inset of 0 mm and the near point located at 11 mm vertically from the PRP (prism reference point).

Figure 10:
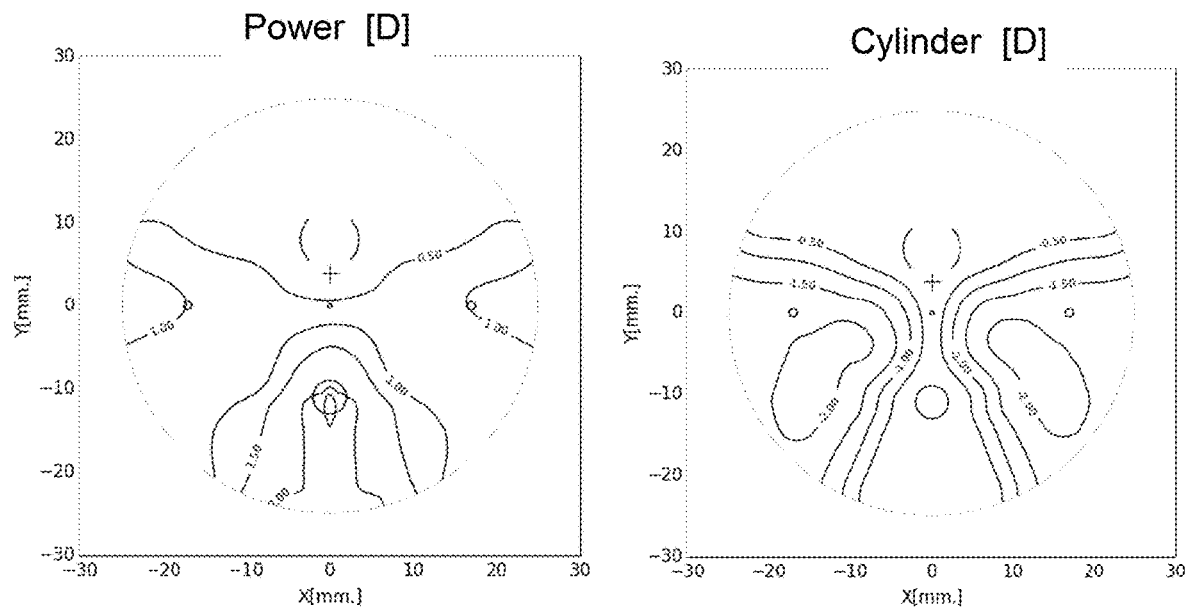
FIG. 10 shows a power map (left) and astigmatism map (right) with minimisation of the target function using formula 0 with all the weights strictly greater than 0.

Formula 0, wherein $w1_i$>0, $w2_i$>0, $w3_i$>0 is considered (an average of the summation of the astigmatism and the summation of the astigmatism gradient is minimised) (see FIG. 10).

Figure 11:
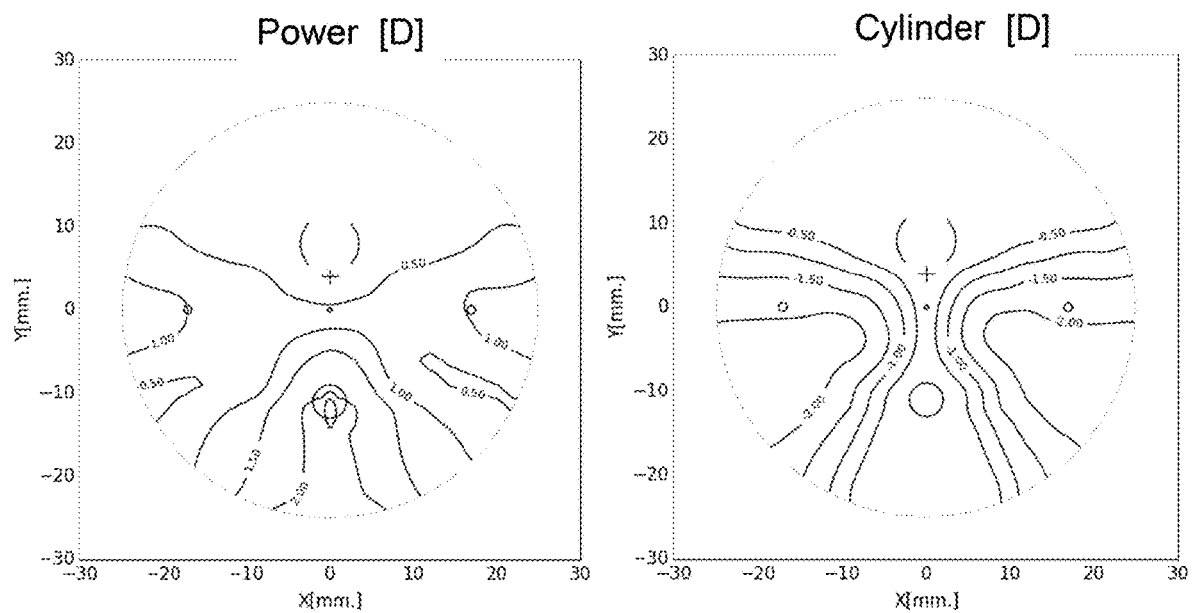
FIG. 11 shows a power map (left) and astigmatism map (right) with minimisation of the target function using formula 0 with $w1_i=0$.

Now formula 0, wherein $w1_i$>0, >0, $w3_i$>0 is considered (the summation of the astigmatism gradient is minimised) (see FIG. 11).

It can be observed that the global summation of astigmatism of FIG. 10 is less than the global summation of astigmatism of FIG. 11. It can be observed in FIG. 10 that the isolines of 2 dioptres of astigmatism are closed, whereas in FIG. 11 they are open (the average value of astigmatism being higher).

Formula 0, wherein $w1_i$>0, $w22_i$>0, $w3_i$=0, is considered (the summation of the astigmatism is minimised). It can be observed in FIG. 12 that the isolines of astigmatism are very close together (closer than in FIGS. 10 and 11), since the astigmatism gradient has not been minimised in this case.

Figure 12:
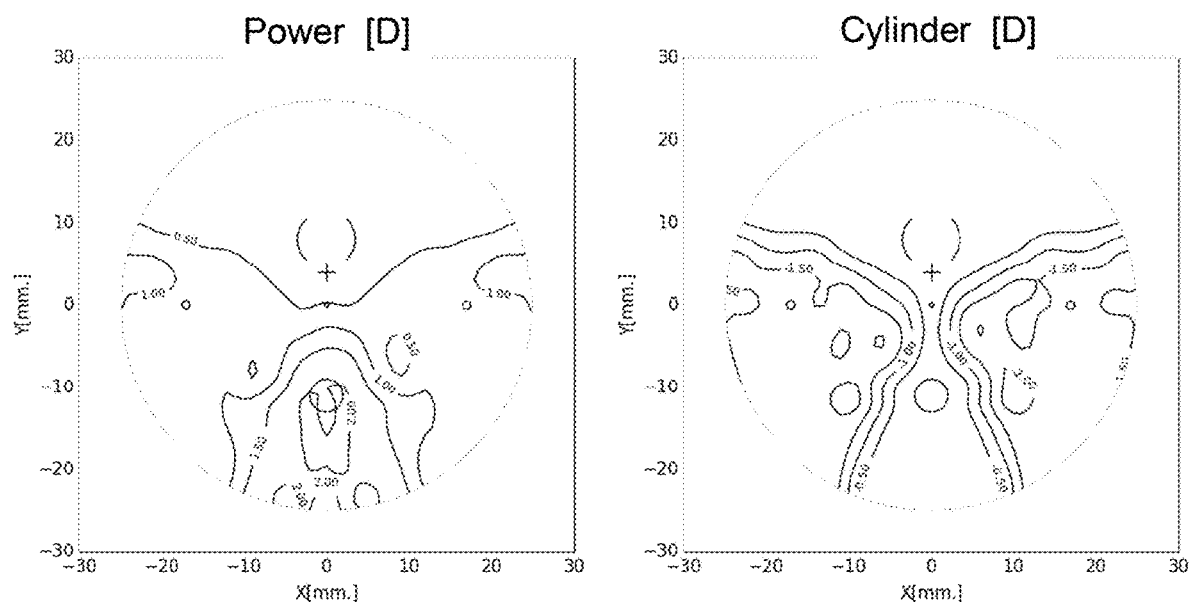
FIG. 12 shows a power map (left) and astigmatism map (right) with minimisation of the target function using formula 0 with $w3_i=0$.
Figure 13:
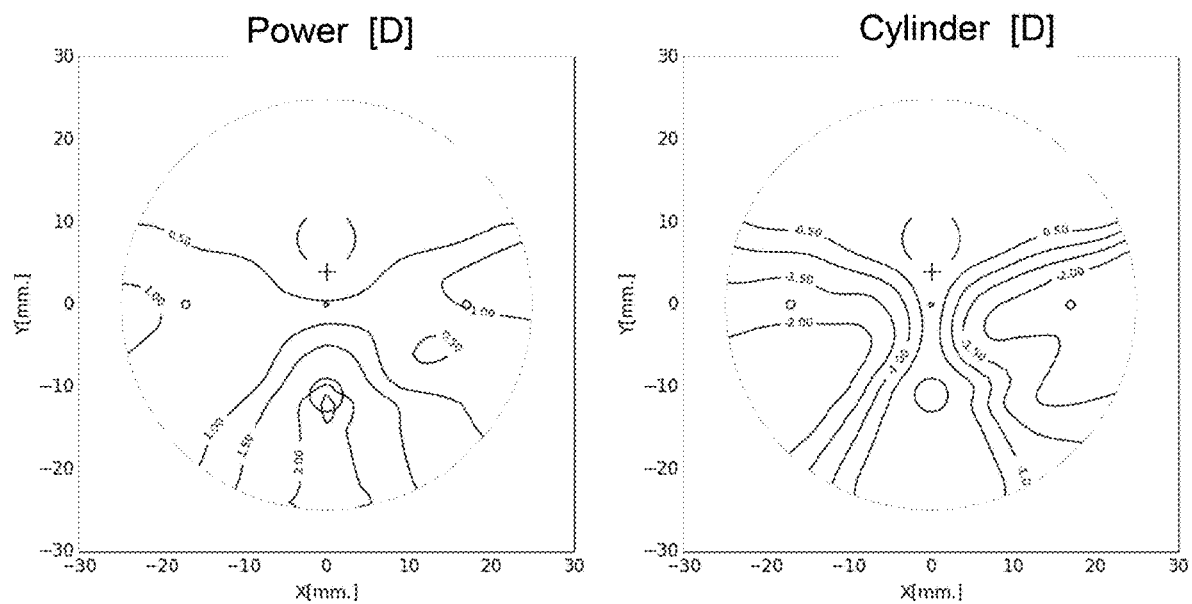
FIG. 13 shows a power map (left) and astigmatism map (right) with minimisation of the target function using formula 1 with α=30°.
Figure 14:
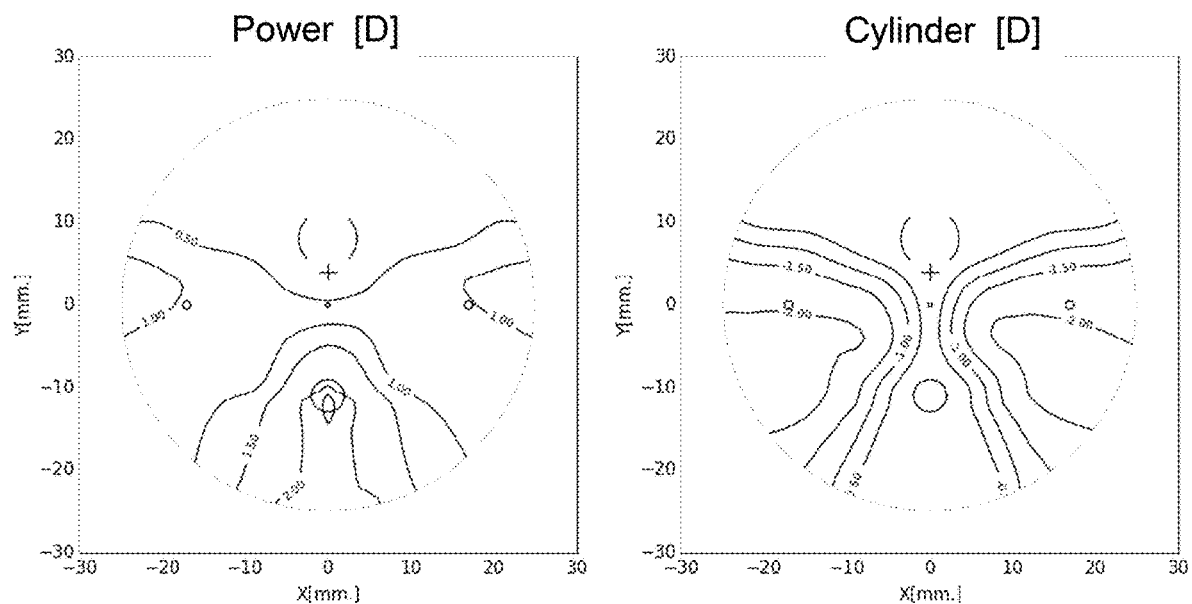
FIG. 14 shows a power map (left) and astigmatism map (right) with minimisation of the target function using formula 2 with α=30°.
Figure 15:
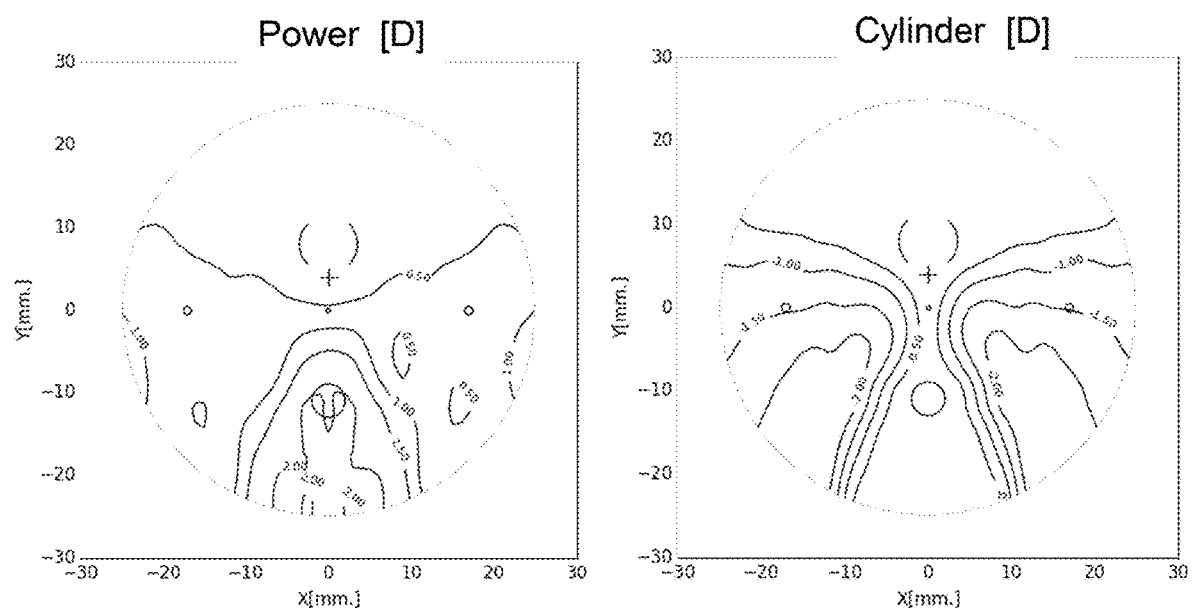
FIG. 15 shows a power map (left) and astigmatism map (right) with minimisation of the target function using formula 2 with α=90°.
Figure 16:
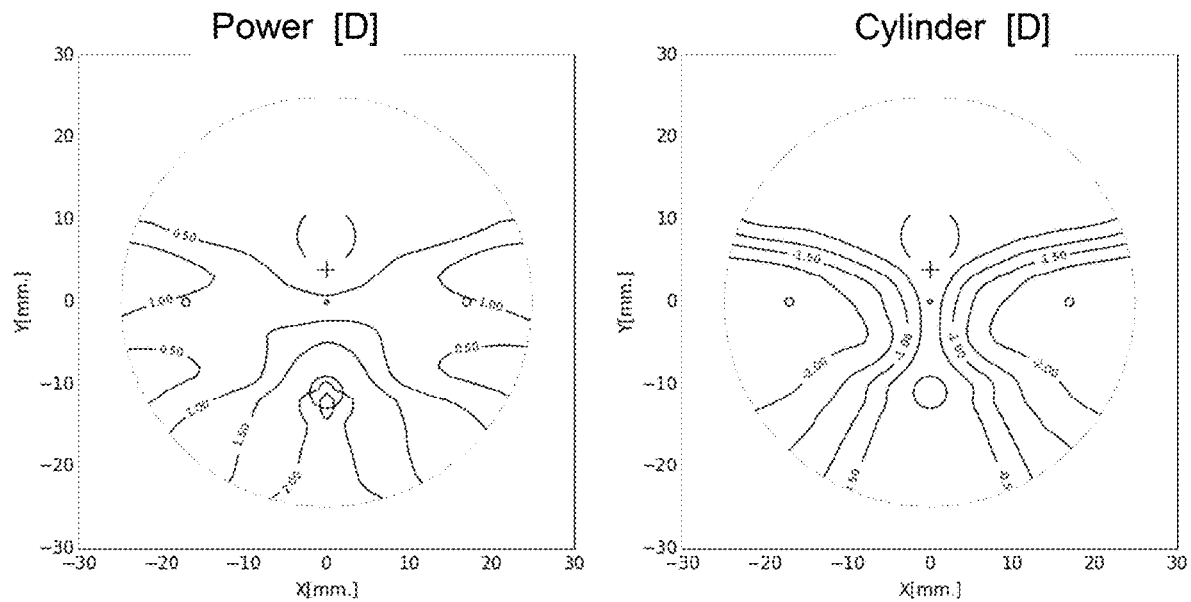
FIG. 16 shows a power map (left) and astigmatism map (right) with minimisation of the target function using formula 2 with α=0°.

It can be observed that the summation of astigmatism of FIG. 12 is still less than the summation of astigmatism of FIG. 10 (and obviously that of FIG. 11). That is because minimisation of the summation of astigmatism has been imposed in FIG. 12. It can be observed in FIG. 12 that there is only one small island of 2D of astigmatism, and the remaining lateral astigmatism is less than 2D.

It should be pointed out that the progressive lenses of FIGS. 10, 11 and 12, since they are obtained with the target function of formula 0, are not new examples, but rather examples carried out using the current literature, see the Meister document (p. 249, column 1). It should, however, be pointed out that these examples have not been used by companies in the sector. It is also pointed out that although formula 0 is mentioned in the Meister document, no reference is made to its variants which are used in FIGS. 10, 11 and 12.

Based on FIGS. 10, 11 and 12, using formulas other than formula 0, examples are obtained which are indeed innovative. These examples are presented below in FIGS. 13, 14, 15, 16 and 17.

Continuing with the preceding examples, formula 1 with $\alpha_i$=30° for the entire surface of the lens is considered. It can be observed that the obtained lens is very asymmetric (see especially the cylinder map). See FIG. 13.

Formula 2, with $\alpha_i$=30° for the entire surface of the lens, is considered. It can be observed that the resulting lens is virtually symmetric except the error of the numerical convergence of the optimisation algorithm used. See FIG. 14.

Formula 2, with $\alpha_i$=90° for the entire surface of the lens, is considered. See FIG. 15.

Formula 2, with $\alpha_i$=0 for the entire surface of the lens, is considered. See FIG. 16.

Formula 2bis, with $\alpha_i$=90° for $y_i$≥0 and $\alpha_i$=0° for $y_i$<0, is considered. See FIG. 17.

One and the Same Example Taking Variants of Formulas 0, 1, 2, 4 and 5 into Account with Alpha at 30°:

One and the same progressive lens base design is considered where by changing the target function using formulas 0, 1, 2, 4 and 5 different progressive lenses are obtained. The base design is a progressive lens with an addition of 2 dioptres, an inset of 0 mm and the near point located at 12.5 mm vertically from the PRP.

Case A: target function of formula 0 with $w1_i$>0, $w2_i$>0, $w3_i$=0, that is, the summation of astigmatism is minimised. See FIG. 18.

Case B: target function of formula 0 with $w1_i=0$, $w2_i>0$, $w3_i>0$, that is, only the summation of the astigmatism gradient is minimised. See FIG. 19.

Figure 18:
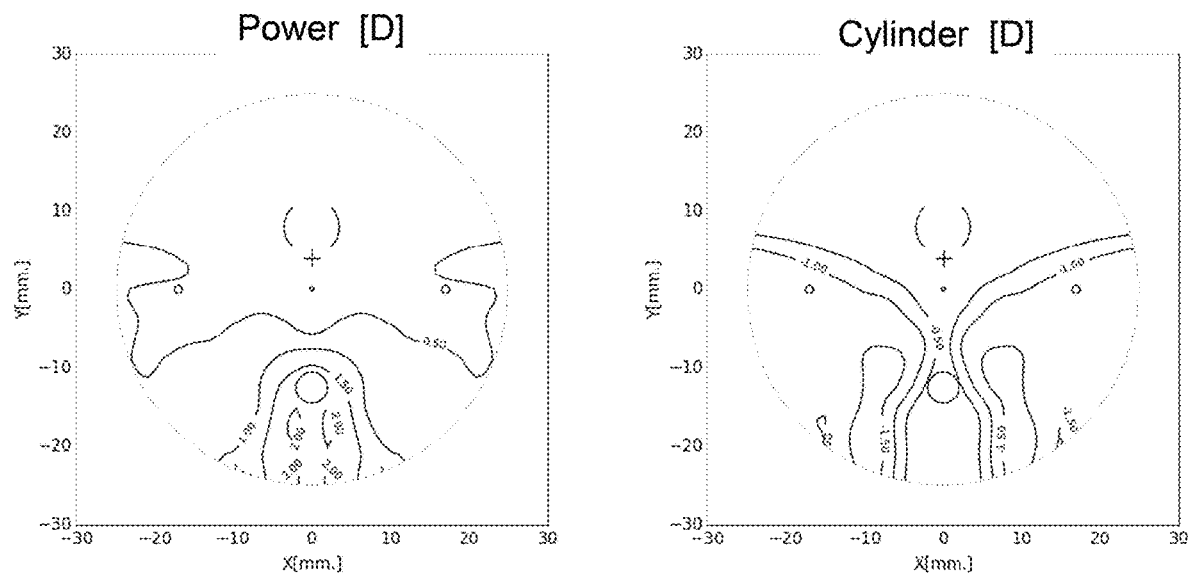
FIG. 18 shows a map of the progressive lens obtained with formula 0 and $w1_i$>0, $w2_i$>0, $w3_i$=0.
Figure 19:
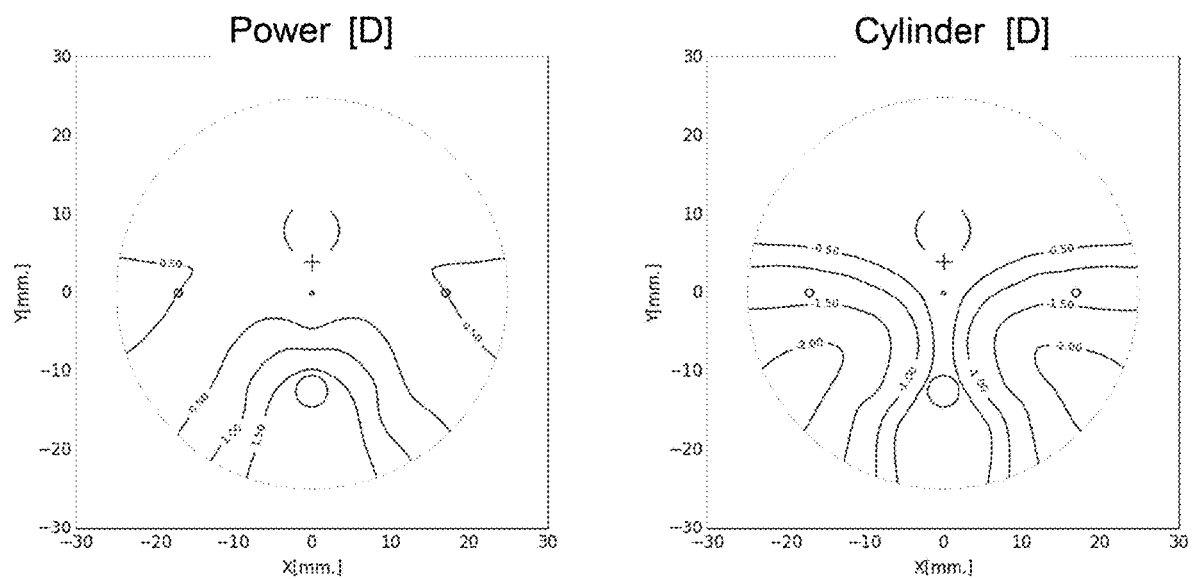
FIG. 19 shows a map of the progressive lens obtained with formula 0 and $w1_i$=0, $w2_i$>0, $w3_i$=0.
Figure 20:
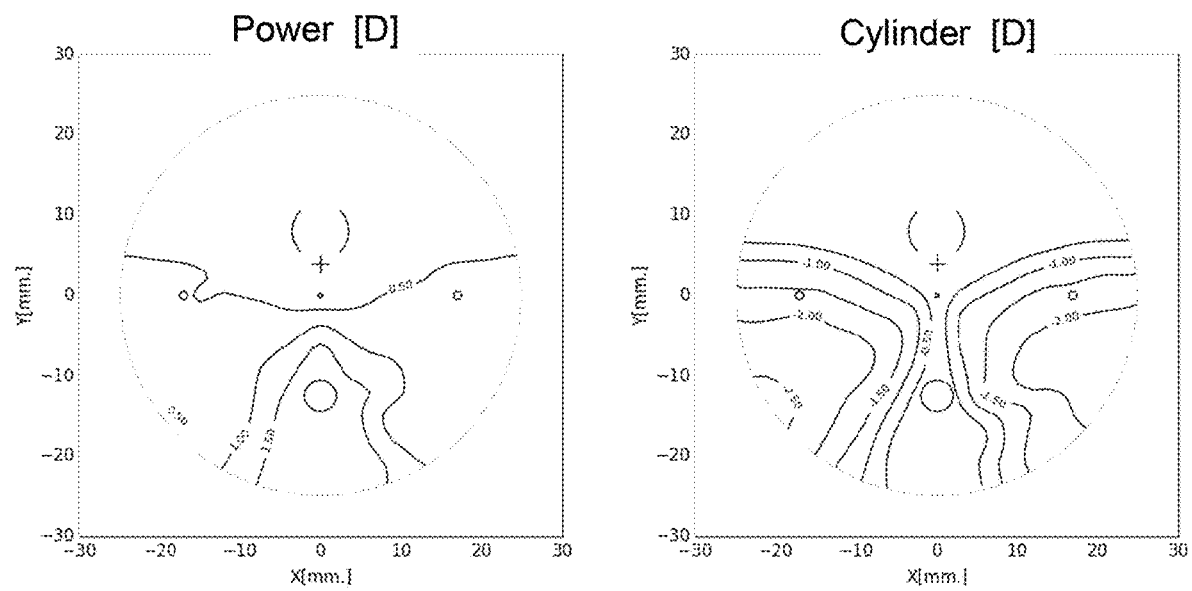
FIG. 20 shows a map of the progressive lens obtained with formula 1 and α=30° (asymmetric lens with respect to the vertical axis x=0 mm).
Figure 21:
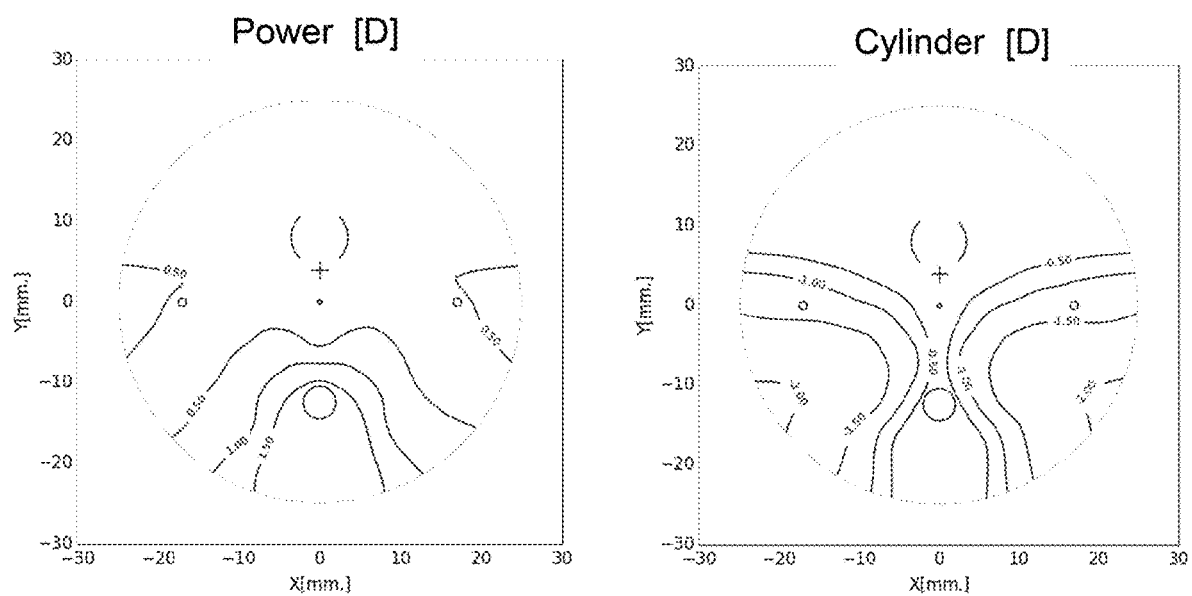
FIG. 21 shows a map of the progressive lens obtained with formula 2 and α=30° (symmetric lens with respect to the vertical axis x=0 mm, barring numerical error of the optimisation algorithm used).
Figure 22:
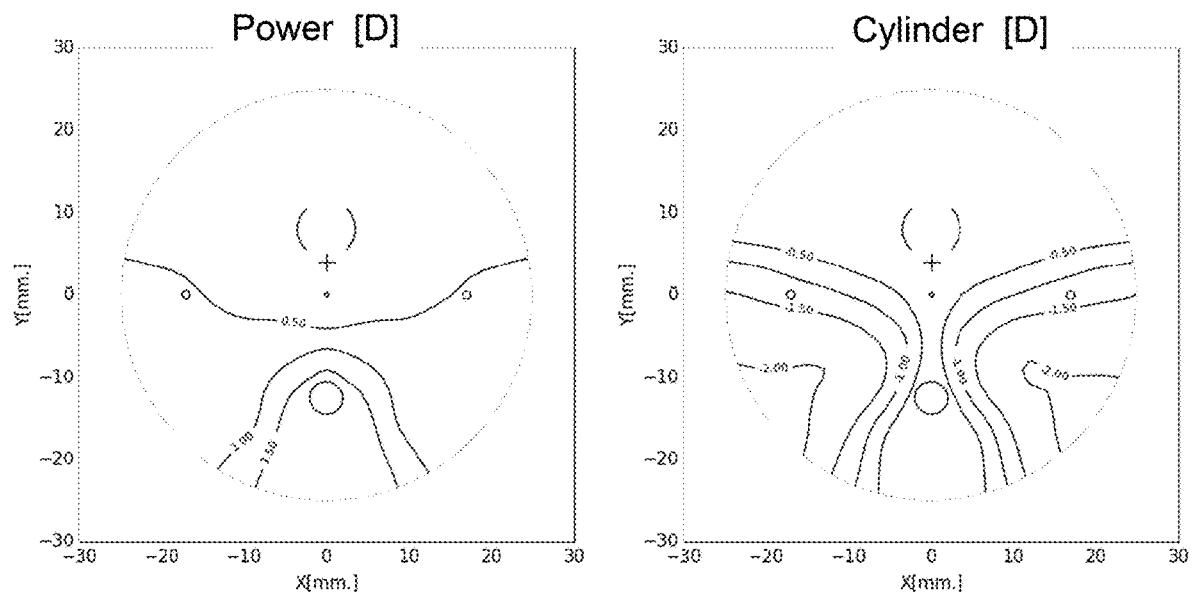
FIG. 22 shows a map of the progressive lens obtained with formula 4 and α=30° (symmetric lens with respect to the vertical axis x=0 mm, barring numerical error of the optimisation algorithm used).
Figure 23:
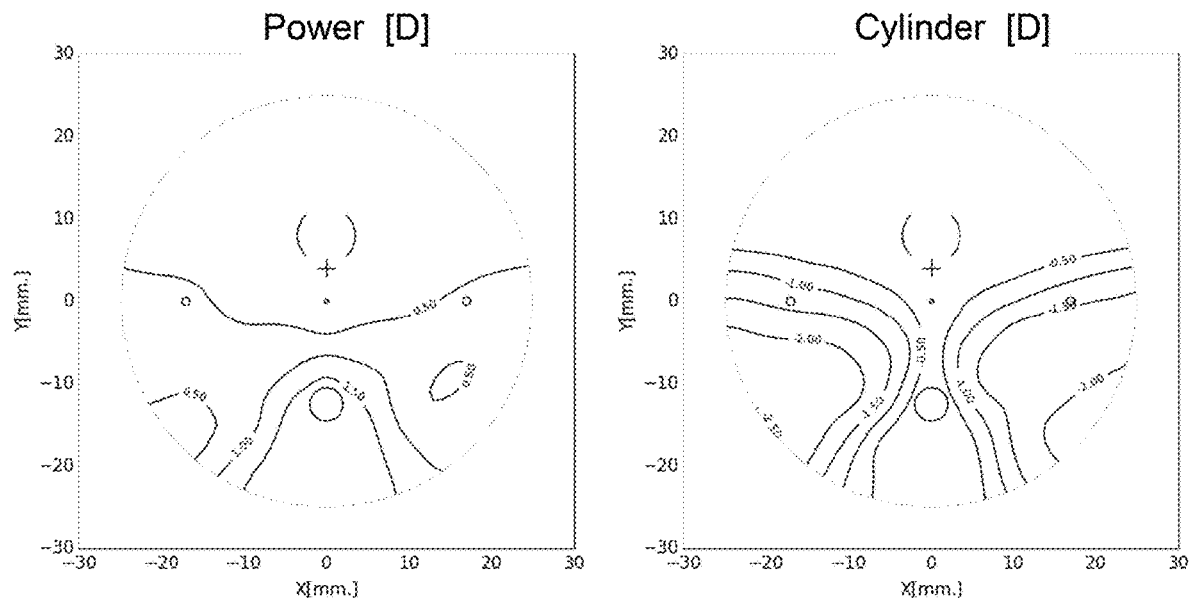
FIG. 23 shows a map of the progressive lens obtained with formula 5 and α=300 (asymmetric lens with respect to the vertical axis x=0 mm).

It should be pointed out that the progressive lenses of FIGS. 18 and 19, since they are obtained with the target function of formula 0, are not new examples, but rather examples carried out using the current literature, see the Meister document (p. 249, column 1). Based on FIGS. 18 and 19, using formulas other than formula 0, examples are obtained which are indeed innovative. These examples are presented below in FIGS. 20, 21, 22 and 23.

Case C: target function of formula 1 with $\alpha=30°$. See FIG. 20.

Case D: target function of formula 2 with $\alpha=30°$. See FIG. 21.

Case E: target function of formula 4 with $\alpha=30°$. See FIG. 22.

Case F: target function of formula 5 with $\alpha=30°$. See FIG. 23.

Use Applications

Taking the preceding formulas (or combinations thereof, especially those in the section entitled "One and the same example taking variants of formulas 0, 1, 2 and 2bis into account") into account, different use applications are considered for designing progressive lenses.

Use 1: According to the Visual Map

Figure 24:
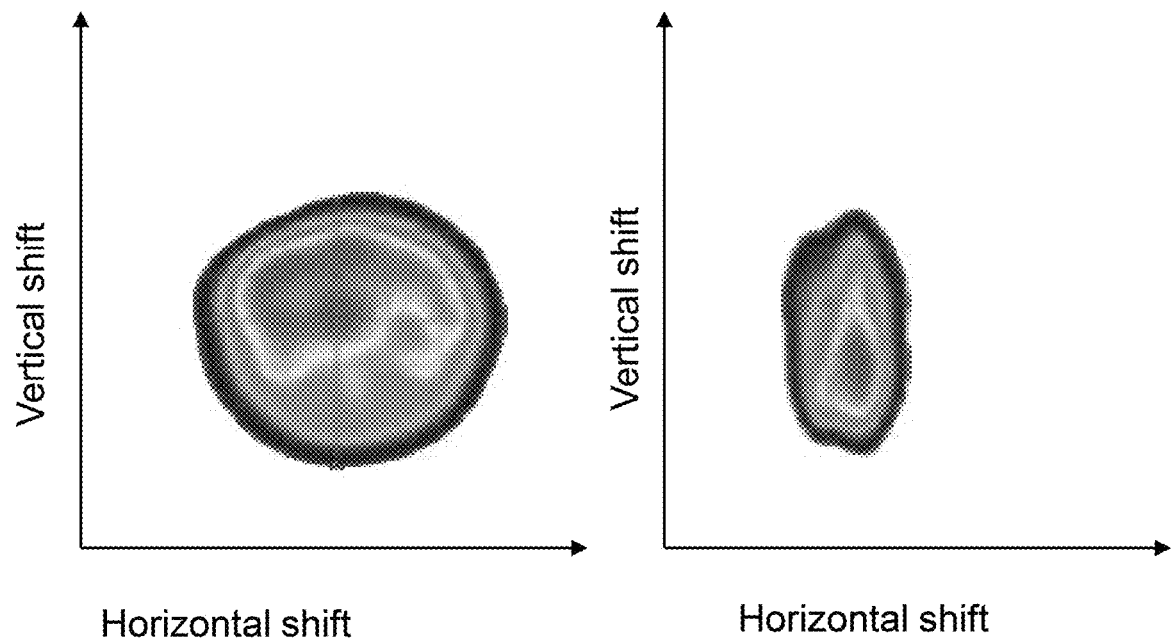
FIG. 24 shows two examples of visual maps.

INDO invention patent WO 2005/107576 A1 establishes the visual behaviour of a person, recording the movement of the subject's head, the movement of his/her eyes, determining the relative orientation of the eye with respect to the head, and determining the amount of time for which the eye is maintained in each orientation. This amount of time is determined by collecting the records of orientations in finite intervals and counting the number of records (frequency) in each interval. Said orientations are specified using two angular coordinates for either the head or the eye. The data are detected and processed with the aid of a device comprising light emitters which are fixed to the head, cameras and a screen for attracting the individual's gaze. The results from said method are used in order to customise the design of a lens for spectacles. FIG. 24 shows two examples of visual maps of two different users.

An effective solution consists of recommending softer progressive lens designs for individuals which show larger maps, which indicates that they use a larger visual field of the lens (they move their eyes more).

What is known in the sector as a soft design consists of progressive lens designs which sacrifice the size of the useful distance and near zones in exchange for allowing softer transitions of the astigmatism gradient when moving towards the non-useful zones of the sides of the corridor, as well as smaller absolute values of lateral astigmatism.

On the contrary, a hard design offers larger near and distance zones, but it has more abrupt transitions towards aberration zones, with more pronounced increments of astigmatism and larger absolute values. It is generally accepted that people who move their eyes very little show better tolerance to designs of this type.

The designs of progressive lenses achieved with formula 2, with angle $\alpha_i=0$, allow directionally optimising astigmatism gradients for individuals who move their eyes more horizontally, leaving the gradient to still be hard vertically, and thus avoiding having to sacrifice the area size of the distance and near zones. This represents an advantage with respect to the conventional soft designs since it is a solution that allows having at the same time larger zones and smooth transitions in the direction in which the user needs it the most.

Complementarily, the designs of progressive lenses achieved with formula 2, with angle $\alpha_i=90$, allow directionally optimising gradients for individuals who move their eyes very little, or who move them more vertically, without having to sacrifice area size of the distance or near zones, which represents an advantage with respect to the conventional hard designs as it again allows having the best of both worlds.

One aspect of the present invention consists of relating the visual map, a personal, unique and reproducible feature, with an optimisation of the astigmatism gradient of corrective lenses that favours the person's vision strategy. To that end, a visual map is needed and the areas that are most frequently used must be favourably related to the astigmatism map of the lens.

Examples of optimisation of the astigmatism gradient and how they would be related to different visual map profiles are seen below:

Case 1) Optimisation with Alpha at 90.

In this case, a progressive lens with a very particular distribution of astigmatism is obtained. This optimisation offers a large distance zone, with a wide and clean corridor and a narrow near zone (see the left side of FIG. 25).

Figure 25:
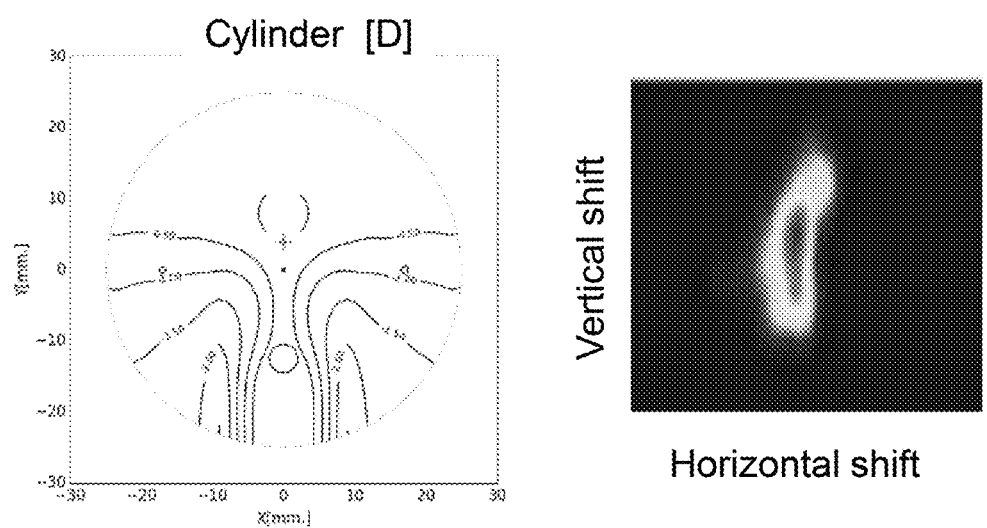
FIG. 25 shows: (left) an example of minimisation of the astigmatism gradient at 90, and (right) a visual map of a person moving his/her head that could be assigned a progressive lens like the one of the previous design.

This design could be assigned to a person who mostly moves his/her head and only moves his/her eyes in the vertical direction: his/her visual map is compact and elongated like the one on the right side of FIG. 25.

This optimisation offers a wider and cleaner corridor, such that invasions of astigmatism in distance and near zones are in zones with little vision scanning frequency. As can be seen by comparing the two plots of FIG. 25, the progressive lens would not be incompatible with this individual's gaze.

Note: The presented examples are an attempt to explain the advantages of the method for optimisation in question and in no case do they intend to demonstrate that the proposed design is the best possible for the case set forth.

Case 2) Optimisation with Alpha at 0

Figure 26:
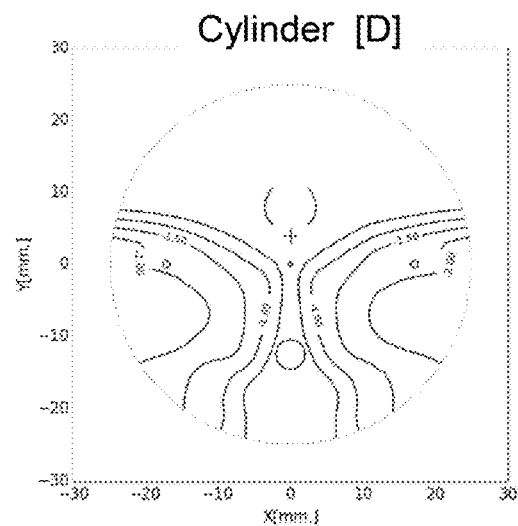
FIG. 26 shows: (left) an example of an optimised lens according to minimisation of the astigmatism gradient at 0, and (right) a visual map of a person moving his/her eyes.
Figure 26:
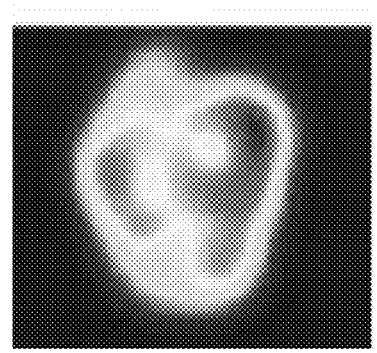

A progressive lens which also has a large distance zone, but with a very wide near zone, is obtained in this case, with the aberrations close to the zone of the corridor being smoother than those in the preceding example (see the left side of FIG. 26).

This design could be assigned to a person who, when gazing, mostly moves his/her eyes and not his/her head: his/her visual map is rounded and large and covers a large part of the plane of sight, as can be seen on the right side of FIG. 26.

As can be seen by comparing the two plots of FIG. 26, the progressive lens would not be incompatible with this person's gaze.

It should be pointed out that there are multiple ways of gazing and that each case should be analysed in a particular manner, with the examples set forth being only two extreme cases.

There is a possibility of separately optimising the upper zone and the lower zone of the progressive lens, considering, for example, optimisation with an astigmatism gradient with alpha at 90 for the upper part of the lens (distance zone) and with alpha at 0 for the lower part (near zone).

Usually, a person's feature of sight is in an intermediate range of the examples that are presented, for example, with a large visual map in the upper zone and more compact than in the lower zone or vice versa. In this case certain directional optimisation of the astigmatism gradient could be applied separately in the upper zone and a more favourable directional optimisation strategy could be considered for the lower zone.

Case 3) Interactive Optimisation

Given that the technical features of a progressive lens are complex and usually unknown for the user, an interesting complement to the argument for the sale of a progressive lens is the possibility that the optician can visually demonstrate the effect of optimising the distribution of astigmatism in particular. Typically, this function is performed by a depiction of astigmatism maps of the lens and, optionally, of the distortion they generate in an object, image, or simply of a regular mesh.

In this context, the possibility that it is the optician who, under his/her criterion, decides what the distribution of astigmatism should be (for example, based on information about use conditions, age, prescription, user's prior experience with previous lenses, etc.), is quite advantageous.

To aid the optician in the task of specifying what the distribution of astigmatism and of the astigmatism gradient should be, it is advantageous for the optician to have an application in which he/she can see and/or demonstrate in an interactive manner the effects of modifying the distribution of astigmatism, in particular, in a customised manner by zones of the lens. This type of interactive optimisation also allows the visual demonstration of the benefits of orienting the astigmatism gradient according to a certain angle, in particular for a certain visual field if the contour of the frame is superimposed.

Use 2: According to the Angle of the Prescription Astigmatism

There have been studies that evaluate the accommodation to blurry images before or after having seen images with a certain level of blurriness in a certain direction. For example, the Sawides, L thesis (Sawides L.: Correction and control of ocular aberrations with adaptive optics: effects on human vision. Instituto de Oftalmobiologia Aplicada. Universidad de Valladolid. Doctoral thesis) proposes the following experiment: the user sees an image that is blurry on the vertical axis, and then sees another image with that is blurry on all the axes. The result is that the user observes less blurriness in the direction in which he/she had previously seen a blurry image than in the other directions. Having said that, the use described in detail in this section is for users with prescription astigmatism. In this case, and as stated in the preceding paragraph and in the aforementioned Sawides document, stronger aberrations of the astigmatism gradient can be introduced in the direction in which the user has a higher astigmatism (since it will bother him/her less). For this reason, the function to be minimised of formula 1 with the angle $\alpha_i$, which corresponds to the prescription astigmatism of the user, will be considered.

Example: for a user with gradient of power of an astigmatism with a certain value of dioptres at 30, the minimisation function of formula 1 with $\alpha_i=30°$ will be used. The progressive lens shown in FIG. 13 will be appropriate for this user.

Use 3: According to the Angle Formed by the Inset of the Progressive Lens

Another example of use consists of considering the angle formed by the segment which joins the distance point with the near point with the horizontal axis and optimising the lens using formula 1 with angle $\alpha$ perpendicular to said angle.

Figure 27:
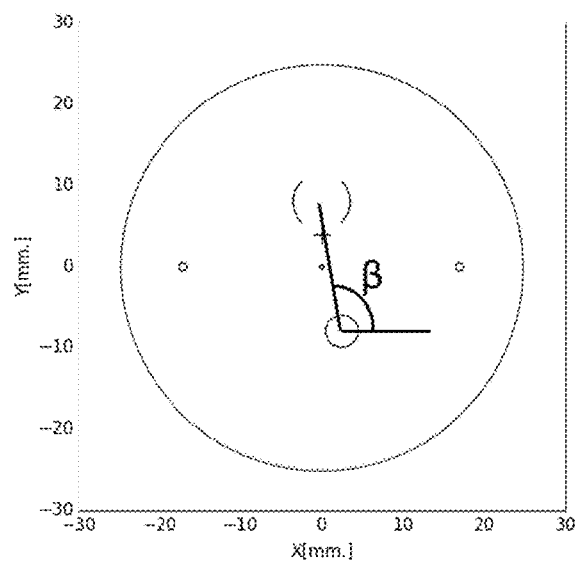
FIG. 27 shows a β angle=98.88 for the angle formed by the straight line joining the distance point with the near point with the horizontal axis (image on the left). The angle α=8.88° is the direction perpendicular to the corridor of the lens (image on the right).
Figure 27:
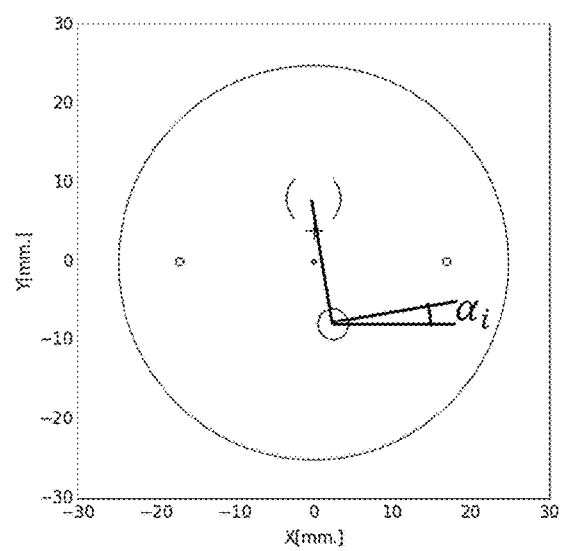

Example: a progressive lens with an inset of 2.5 mm, setup height of 14 mm, the cross located 4 mm above the PRP (prism reference point) and the distance zone at 8 mm from the PRP is considered. The NRP (nearest reference point addition control point) is located 8 mm below the PRP (and 2.5 mm to the right). In this case, the $\beta$ angle formed by the straight line joining the distance point with the near point with the horizontal axis is 98.88 (180-180 a tan(16/2.5)/pi=98.88). See the image of FIG. 27 (image on the left).

Figure 28:
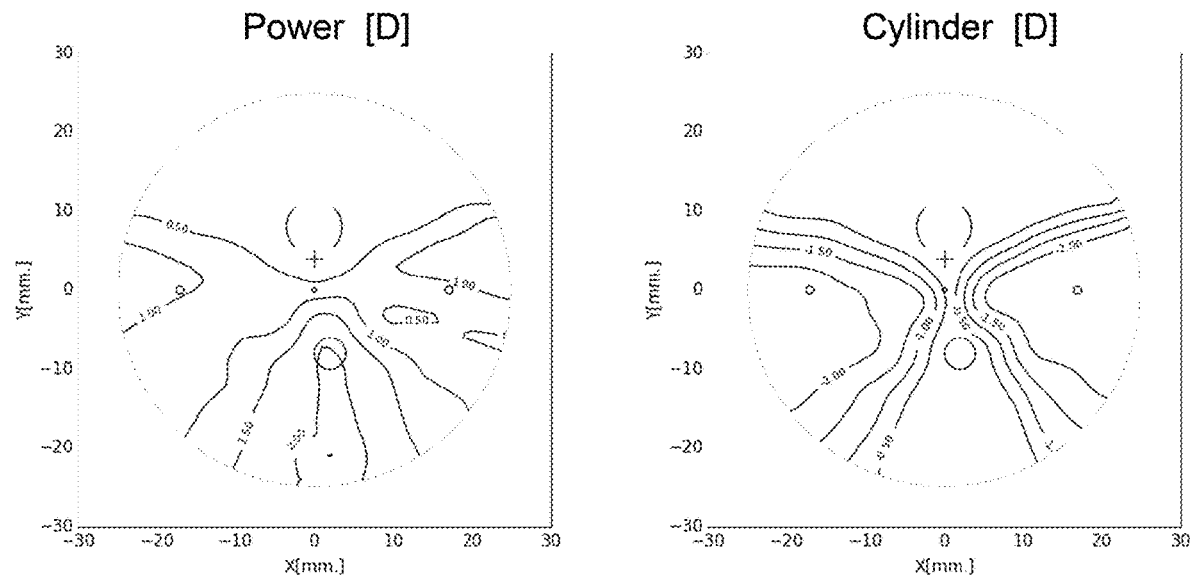
FIG. 28 shows a progressive lens with inset of 2.5 and near point located at 8 mm at a vertical distance from the PRP, obtained using formula 1 with α=8.88°

An optimal lens for the preceding progressive lens is obtained by minimising the direction perpendicular to the direction of the corridor. That is, formula 1 with $\alpha=8.88°$ is used. The isolines would thus be located around the corridor, as far away as possible. In this case, priority is given to the zone of the corridor. The resulting lens can be observed in FIG. 28.

To give priority to other zones, formula 1bis and an angle $\alpha=8.88°$ for the zones close to the corridor, and other values of $\alpha_i$ for the rest of the lens could be considered. See section "Use 5: For a general progressive lens".

Use 4: For Occupational Progressive Lenses

According to the activities a user performs with specific progressive lenses, more priority is given to one zone (distance, intermediate or near) or another. An occupational progressive lens is designed for a specific use. To design an occupational progressive lens, formula 2 with the appropriate angle $\alpha$ will be used.

Example 4.1

For reading activities, a progressive lens optimised according to formula 2 and $\alpha=0°$ will be more comfortable. See, for example, the progressive lens obtained in FIG. 16. It can be observed that the near zone maintains a relatively large area but has isolines of astigmatism that are far apart from one another as if it were a soft design, and this will favour a good reading experience.

Example 4.2

In contrast, for outdoor activities such as hiking or outdoor sports, a progressive lens optimised according to formula 2 and $\alpha_i=90°$ will be more comfortable. See, for example, the progressive lens obtained in FIG. 15, where a larger and cleaner distance area is achieved, and furthermore it has isolines that are far apart from one another in the vertical direction, which will provide a sensation of smoothness during use. The near zone of said progressive lens will have isolines that are very close together; it will be used less frequently and therefore will not be bothersome.

Example 4.3

For driving, where both the distance zone and the near zone are important, the progressive lens with $\alpha_i=30°$ will be suitable. See, for example, the map of the progressive lens of FIG. 14.

Obviously, for the development of occupational progressive lenses, in addition to modifying the target function, as is being patented in this document and shown in the examples, the size of the distance and near zones can be modified. The modification of the size of the near and distance zones can be combined with the modification of the target function.

Use 5: For a General Progressive Lens

For designing an optimal progressive lens for all distances (distance, intermediate and near), formula 2bis with the $\alpha_i$, which best adapts to each zone of the lens, will be chosen.

Example 5.1

For smooth aberrations in the distance zone and minimum distortion around the near zone, two different values of $\alpha_i$ will be used. To obtain minimum aberrations in the distance zone, the target function of formula 2bis with $\alpha_i=90°$ for $y_i \geq 0$ will be used. To obtain minimum distortion around the near zone (that is, for y<0 or y less than a certain negative value), the target function of formula 2bis with $\alpha_i=0°$ for $y_i<0$ will be used. The result of said progressive lens is, therefore, the progressive lens shown in FIG. 17.

Figure 29:
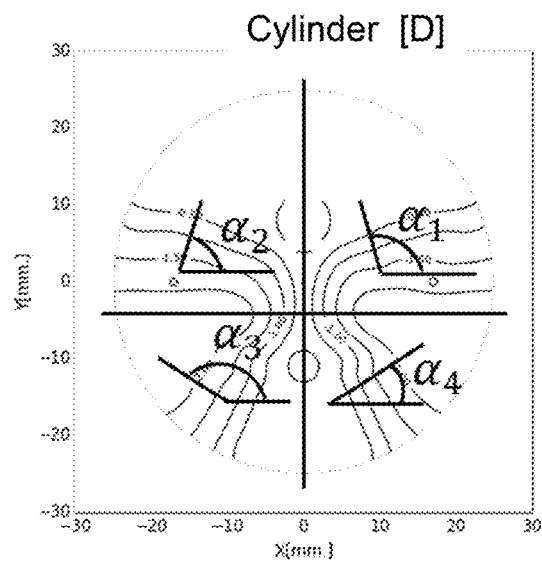
FIG. 29 shows four different values of $\alpha_i$ for each point of the lens.

Example 5.2 Another variant for a general progressive lens can be to divide the lens into 4 quadrants and to obtain in each of the quadrants $\alpha_i$, which is the maximum perpendicular possible with respect to the average isolines of astigmatism of said quadrant. See, for example, the different angles $\alpha_i$ shown in FIG. 29 according to the quadrant 1 ($x_i \geq 0$ mm, $y_i \geq -4$ mm), quadrant 2 ($x_i<0$ mm, $y_i \geq -4$ mm), quadrant 3 ($x_i<0$ mm, $y_i<-4$ mm), quadrant 4 ($x_i \geq 0$ mm, $y_i<-4$ mm).

As can be deduced, the lens can be divided into increasingly smaller zones and the optimal angle $\alpha_i$ can be chosen for each zone of the lens. For example, in FIG. 29 another zone could be added around the intermediate zone.

Figure 17:
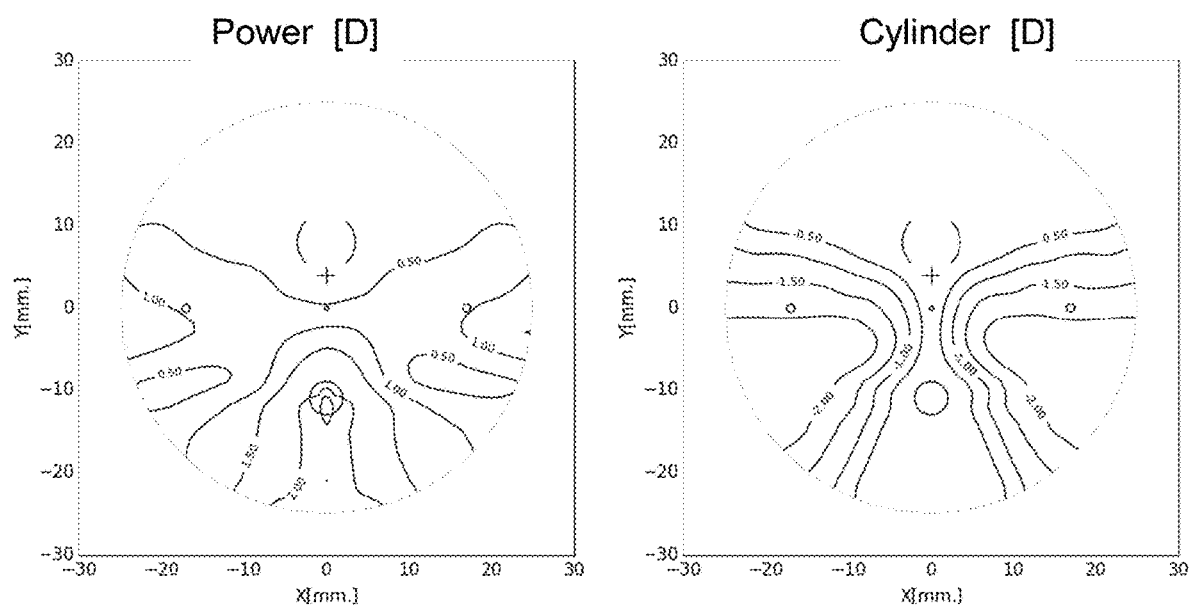
FIG. 17 shows a power map (left) and astigmatism map (right) with minimisation of the target function using formula 2bis with $\alpha_i$=90° for $y_i$≥0 and $\alpha_i$=0° for $y_i$<0.

Example in which the Optical Surface is Divided into Several Different Zones and Wherein Alpha is Selected Independently in Each of them, being Independently Minimised:

A first example is FIG. 17. In this example, a different alpha for y>0 and y<0 is considered. In FIG. 17, formula 2bis with $\alpha_i=90°$ for $y_i \geq 0$ and $\alpha_i=0°$ for $y_i<0$ is taken.

Figure 30:
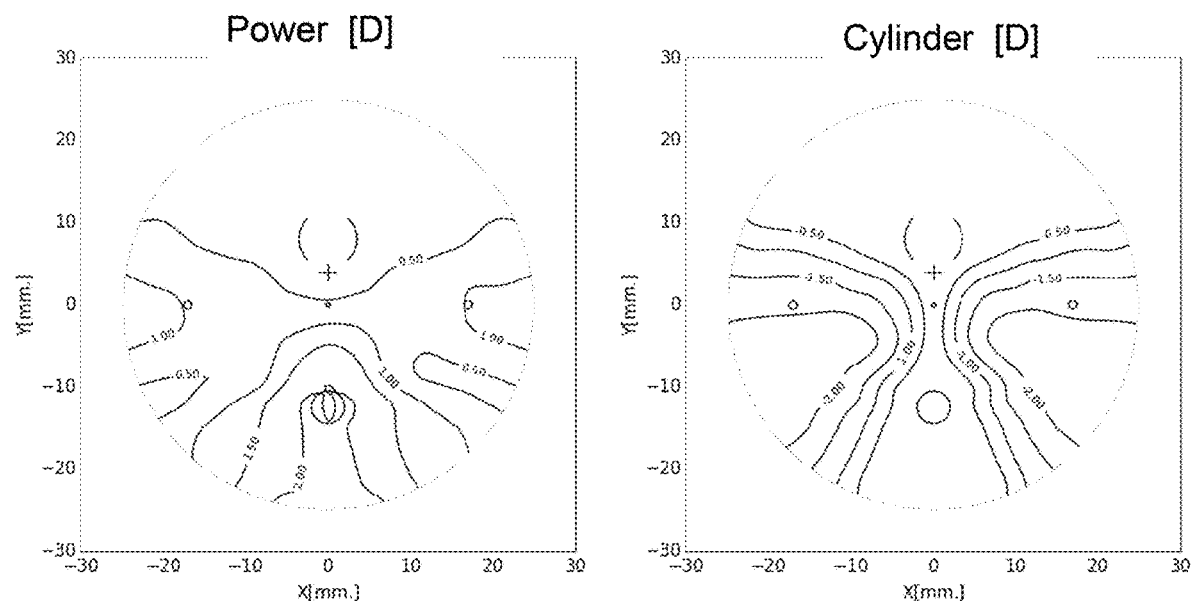
FIG. 30 shows a power map (left) and astigmatism map (right) with minimisation of the target function using formula 2b is with $\alpha_i$=90° for $y_i$≥3.0, $\alpha_i$=45° for −6.0<$y_i$<3.0 and $\alpha_i$=0° for $y_i$≤−6.0.
Figure 31:
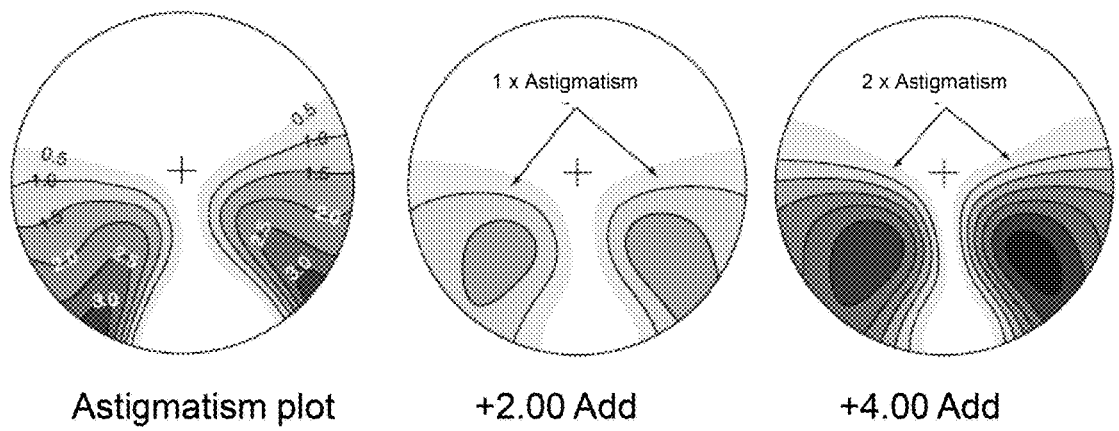
FIG. 31 shows symmetric levels of astigmatism with respect to the vertical axis (with the exception of the effect of the inset)—images obtained from the Meister document.

A second example is FIG. 30. Formula 2bis with $\alpha_i=90°$ for $y_i \geq 3.0$, $\alpha_i=45°$ for $-6.0<y_i<3.0$ and $\alpha_i=0°$ for $y_i \leq -6.0$ is taken.

It can be observed that the two obtained lenses (FIG. 17 and FIG. 30) are very similar.

Consideration of a Metric for Determining the Angle of Optimisation of the Distribution of Astigmatism and Power Gradient.

For a given surface of a progressive lens, four different metrics are considered for determining the distribution of the astigmatism or power gradient.

For given n points uniformly distributed on the surface of the lens, and for each angle $\beta$ between 0 and 180, the following are considered:

$$\sum_{i=1}^{n}\left(\frac{1}{n}\cdot\left(\cos(\beta)\cdot\frac{\partial Ast_i}{\partial x}+\sin(\beta)\cdot\frac{\partial Ast_i}{\partial y}\right)^2\right) \quad [\text{metric 1}]$$

$$\sum_{i=1}^{n}\left(\frac{1}{n}\cdot\left(\cos^2(\beta)\cdot\left(\frac{\partial Ast_i}{\partial x}\right)^2+\sin^2(\beta)\cdot\left(\frac{\partial Ast_i}{\partial y}\right)^2\right)\right) \quad [\text{metric 2}]$$

$$\sum_{i=1}^{n}\left(\frac{1}{n}\cdot\left(\cos(\beta)\cdot\frac{\partial Pow_i}{\partial x}+\sin(\beta)\cdot\frac{\partial Pow_i}{\partial y}\right)^2\right) \quad [\text{metric 3}]$$

$$\sum_{i=1}^{n}\left(\frac{1}{n}\cdot\left(\cos^2(\beta)\cdot\left(\frac{\partial Pow_i}{\partial x}\right)^2+\sin^2(\beta)\cdot\left(\frac{\partial Pow_i}{\partial y}\right)^2\right)\right) \quad [\text{metric 4}]$$

For each value $0 \leq \beta \leq 180$, a value of the metric is thus obtained. The value of the metric has units $(D/mm)^2$ since they are dioptres (of astigmatism or power) between mm, and all squared. The mm are preferably not converted to m (international system), since the measurement of the lens is often expressed in mm and not m.

Preferably, metric 1 will be used for the lenses obtained using the target function F described in formula 1 (and formula 1C and formula 1bis). Metric 2 will be used for the lenses obtained using the target function F described in formula 2 (and formula 2bis and formula 3); metric 3 for the lenses obtained using formula 5 (and formula 5bis), and finally, metric 4 for the lenses obtained using formula 4 (and formula 4bis).

When using metrics 1 and 3 for the optimised lenses using the corresponding target function F (as mentioned above), it is found that the value of the metric of units $(D/mm)^2$ will be minimum for $\beta$ according to the same $\alpha$ for which the lens has been optimised. This will be seen below in example M1 with metric 1, FIG. 32A (white circle). This will not always be true for metrics 2 and 4.

Furthermore, for the four metrics (metrics 1, 2, 3 and 4), by comparing the value of the metric for $\beta=\alpha$ (wherein $\alpha$ is the value used in the target function F), said value will be minimum when compared for all the other lenses optimised using the same target function F and other values of $\alpha$. This will be seen below in example M2 (FIGS. 33A-33L) and in example M3 (FIGS. 34A-34D).

In conclusion, for metrics 1 and 3, for determining the angle $\alpha$ according to which a progressive lens has been optimised, it is sufficient to calculate the metric corresponding to the target function F and choose the $\beta$ value by which the minimum is assumed. Said $\beta$ value will be the corresponding value of $\alpha$. For metrics 2 and 4, for determining the angle $\alpha$ according to which the lens has been optimised, it will be necessary to compare the value of the metric with other metrics of similar lenses calculated with other values of $\alpha$, and choose the $\alpha$ value having the minimum value of the metric for the $\beta=\alpha$ value (compared for the other metrics of other values of $\alpha$).

Figure 32A:
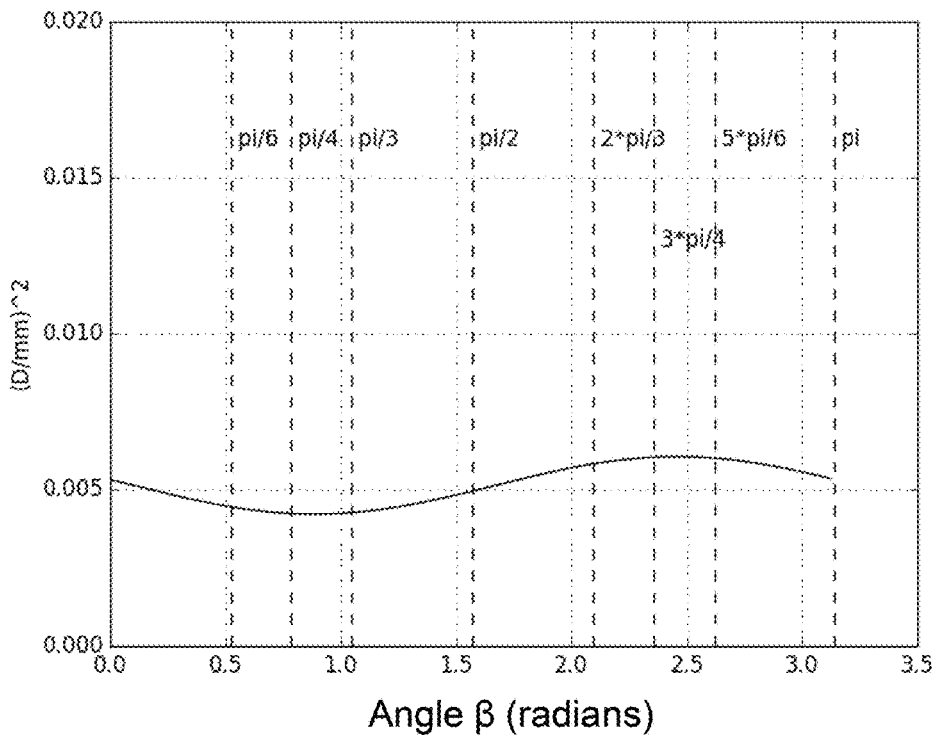
FIG. 32 shows metric 1 for the lenses on the left side of FIGS. 1 and 2 and metric 2 for the lenses on the right side of FIGS. 1 and 2.

Example M1: the lenses of FIGS. 1 and 2 (power map and astigmatism map with the minimisation of the target function using formula 1 on the left and formula 2 on the right) are considered. Based on these 2 lenses, metric 1 is calculated for the lens on the left side of FIGS. 1 and 2, and metric 2 for the lens on the right side of FIGS. 1 and 2. In the image of FIG. 32A, said metric 1 is shown, and in the image of FIG. 32B, said metric 2 is shown.

It can clearly be observed that said metric 1 (image of FIG. 32A) has a minimum for $\beta=45$. This means that the lens optimised with $\alpha=45$ has the minimum value of metric 1 for $\beta=45$. Furthermore, said minimum value of metric 1 is also the lowest for all the metrics of FIGS. 33A-33L (see example M2 below). In FIGS. 33A-33L, the values of metric 1 are depicted for the twelve lenses of FIG. 5, where the target function F of formula 1 for $\alpha=0$, $\alpha=15$, $\alpha=30$, ..., $\alpha=165$ has been used. In FIGS. 33A-33L, the value of metric 1 for the lens generated with formula 1 and $\sigma=45$ is marked with a white circle. This value is always below the curve of the other metrics 1 (see solid circles).

Figure 32B:
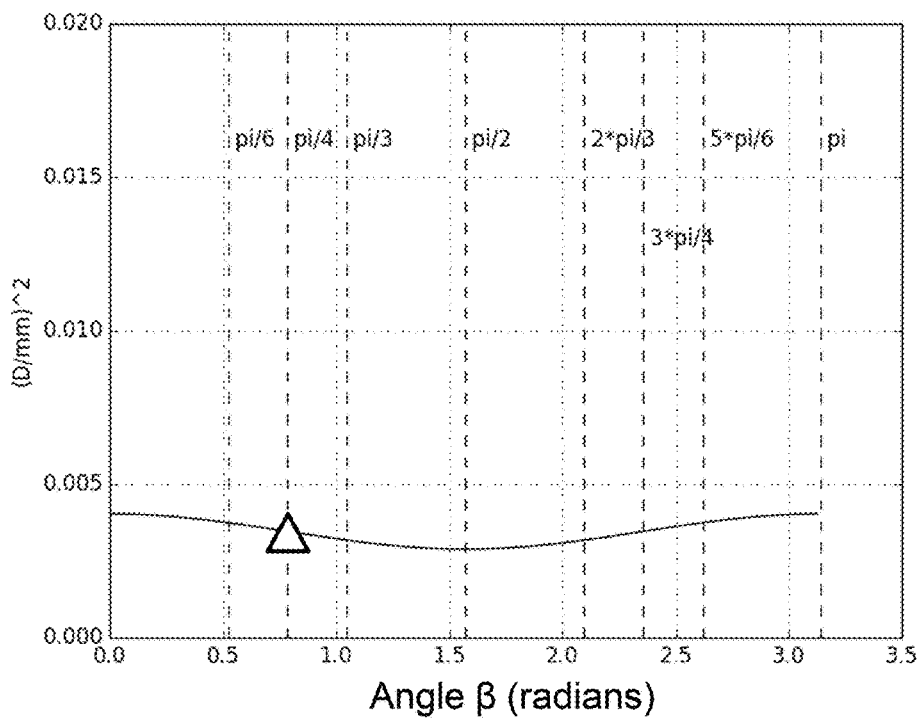
Figure 33A:
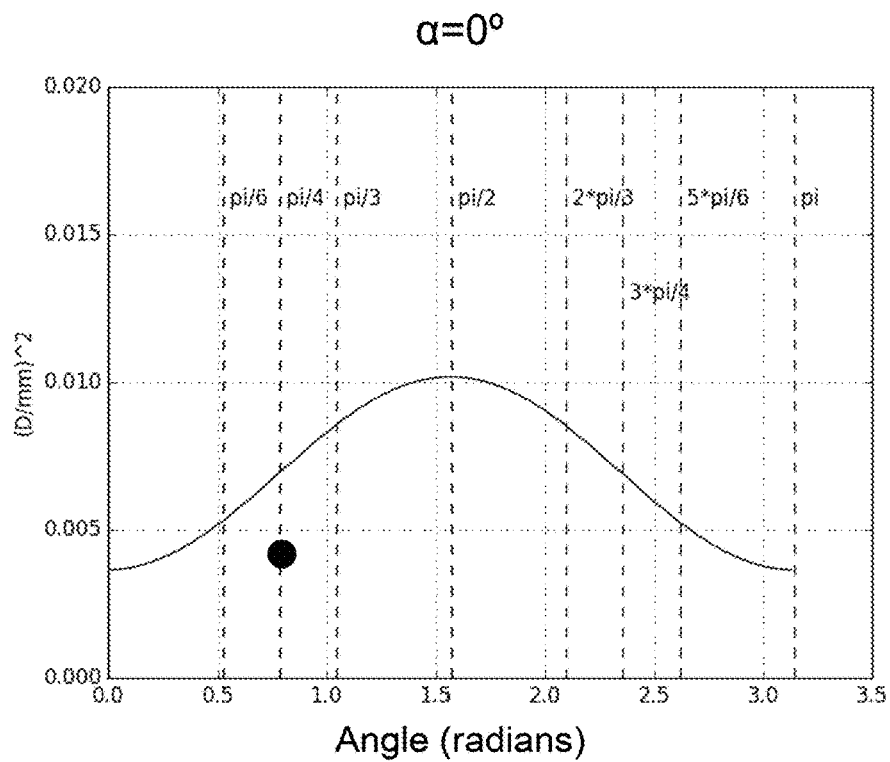
FIG. 33 shows metric 1 of the twelve lenses of FIG. 5.
Figure 33B:
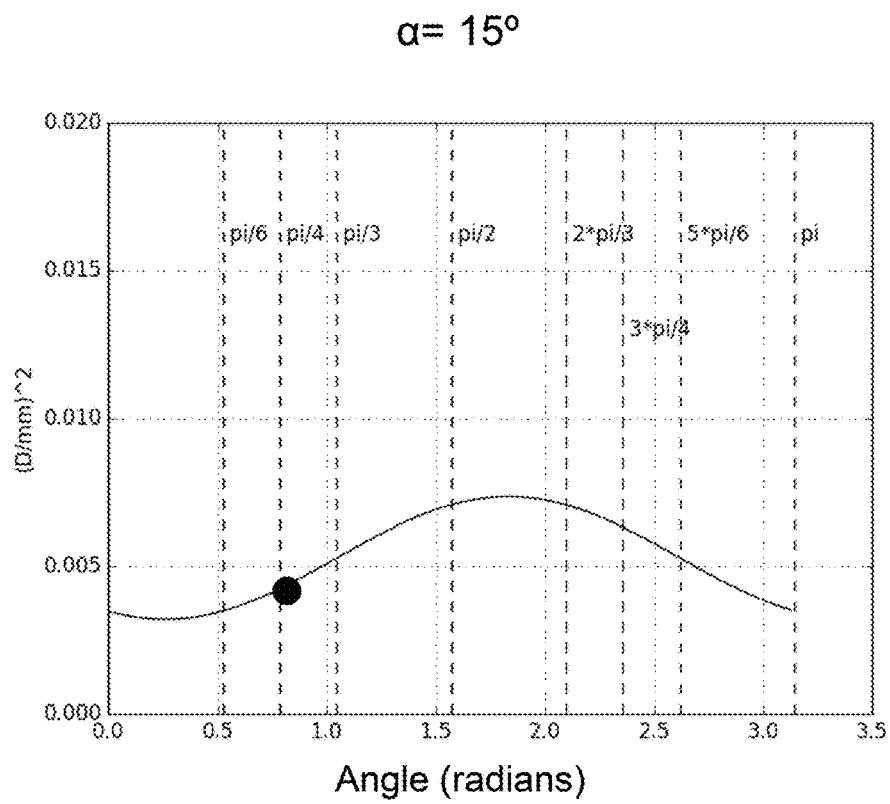
Figure 33C:
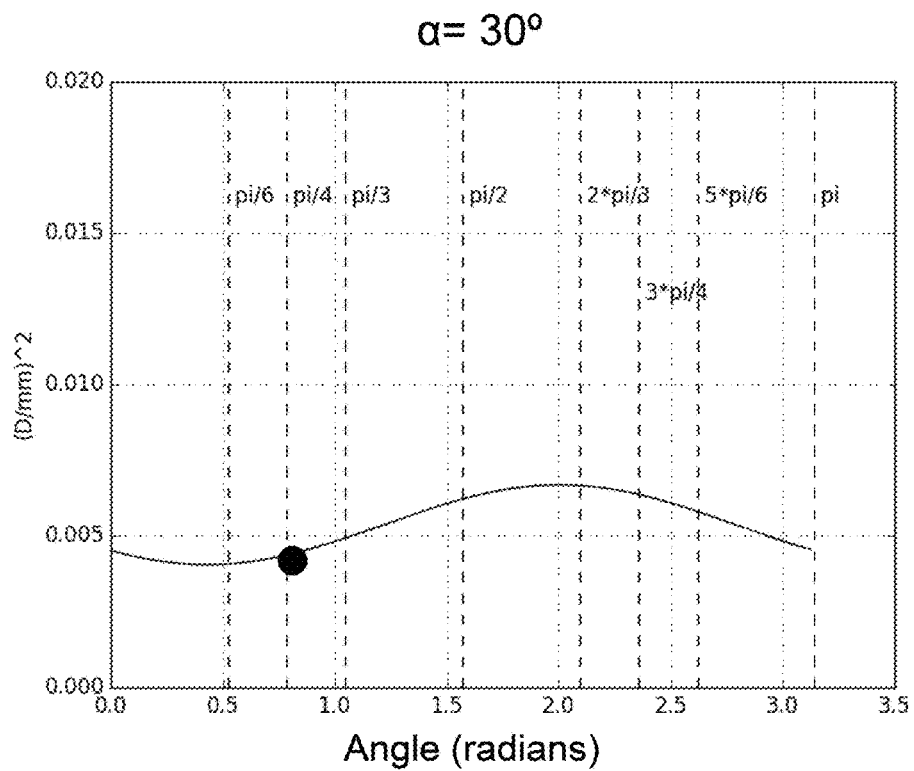
Figure 33D:
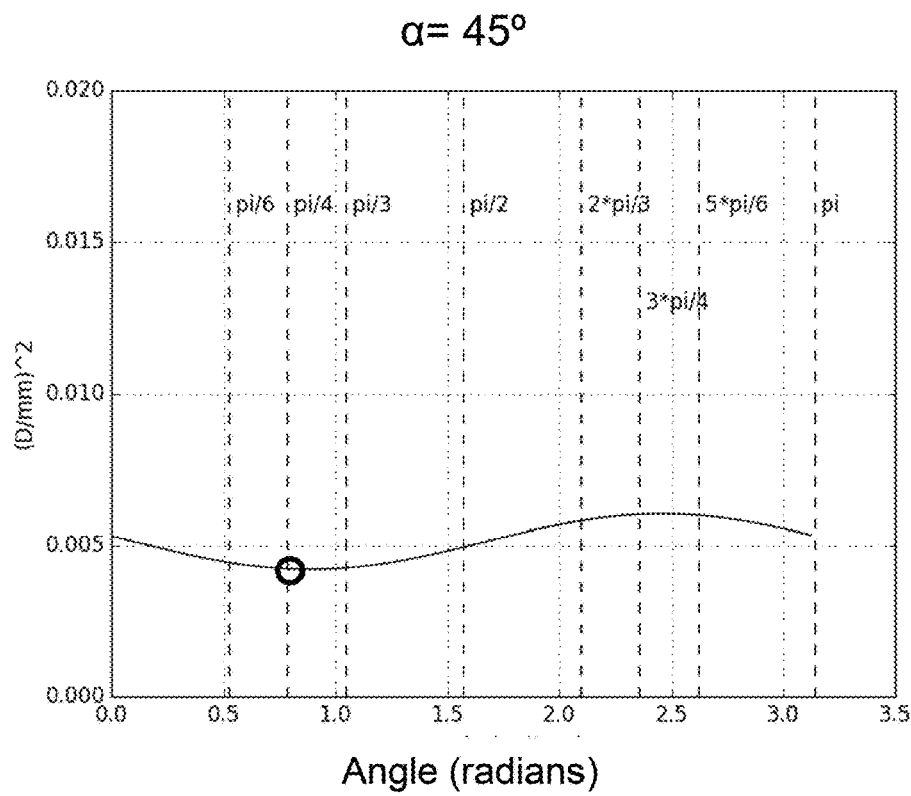
Figure 33E:
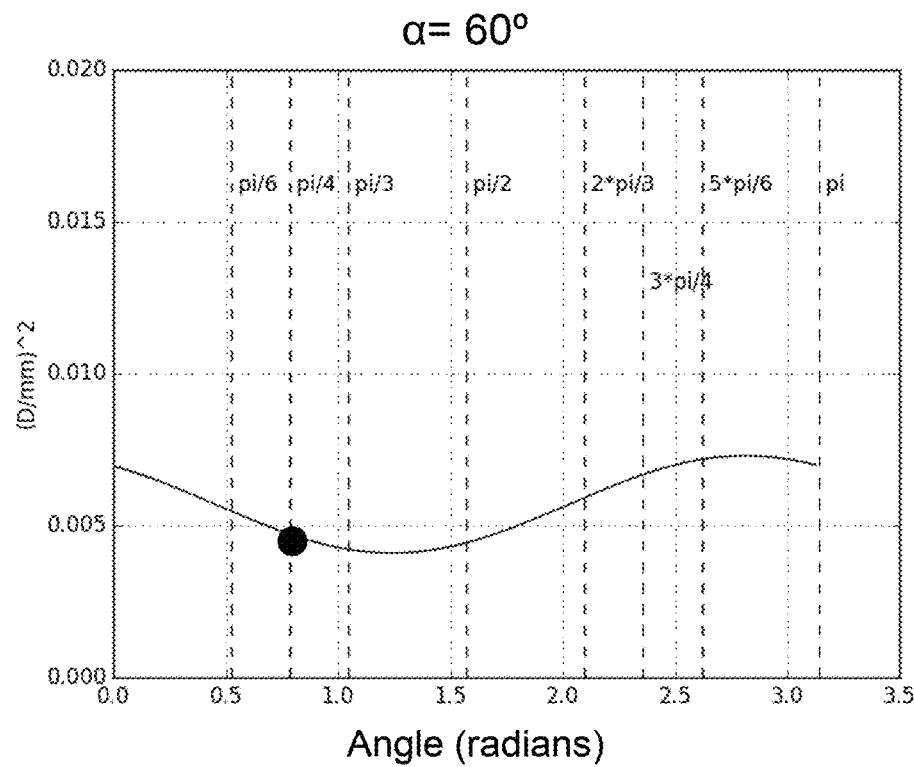
Figure 33F:
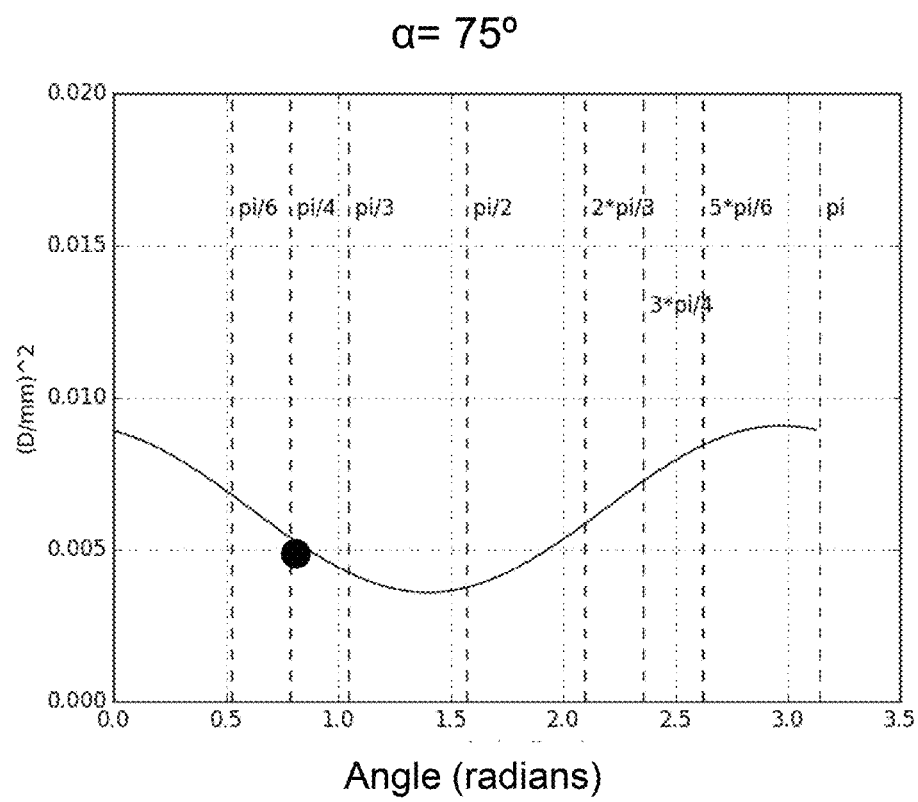
Figure 33G:
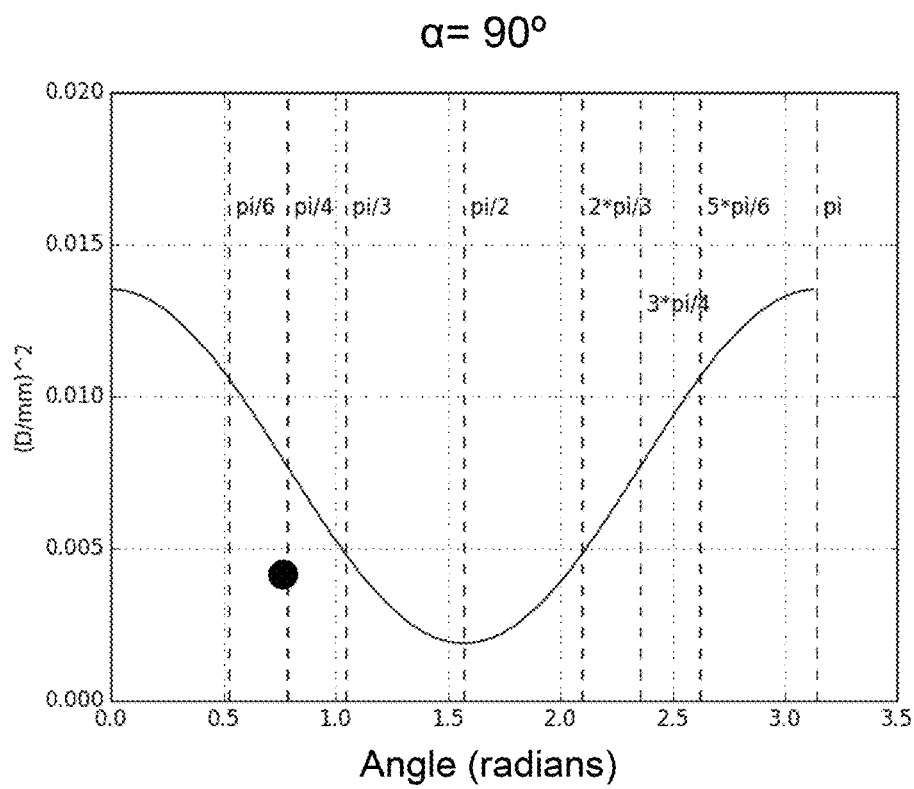
Figure 33H:
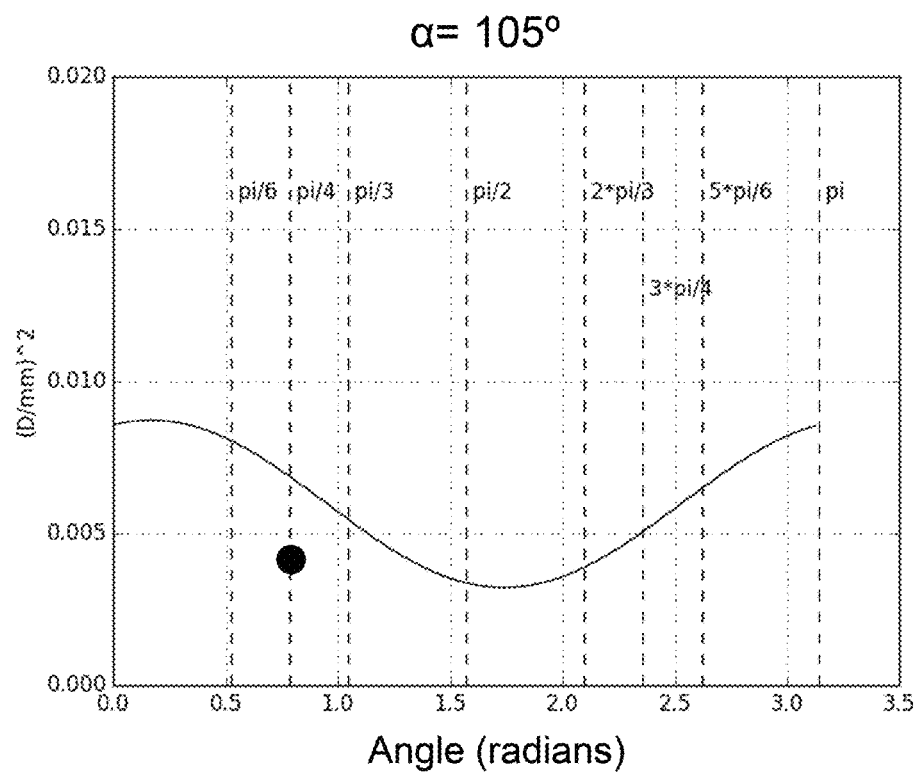
Figure 33I:
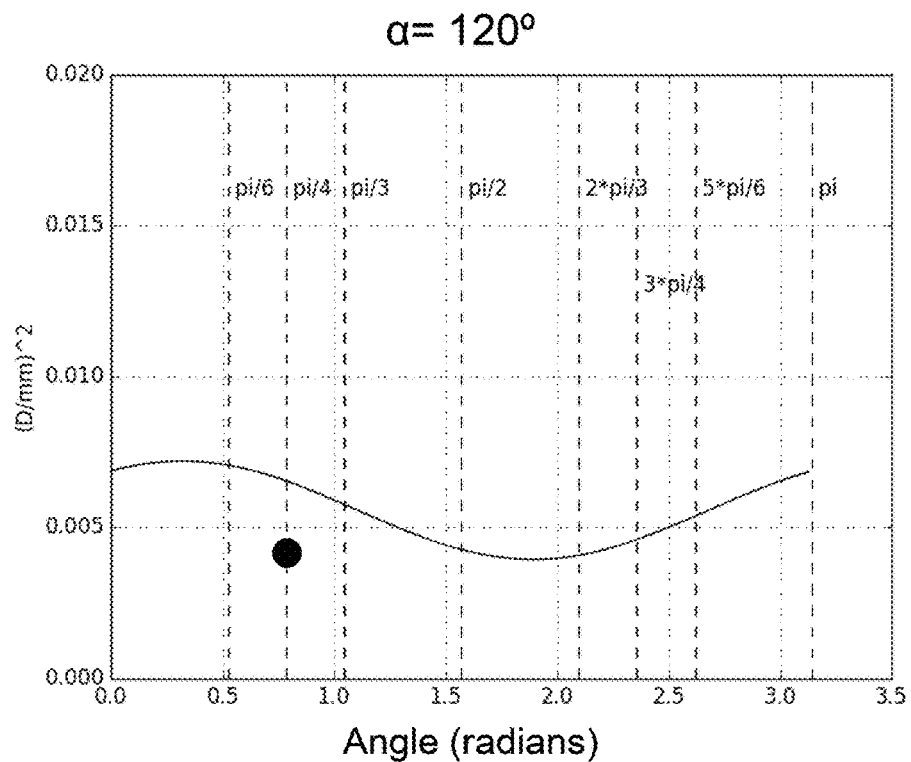
Figure 33J:
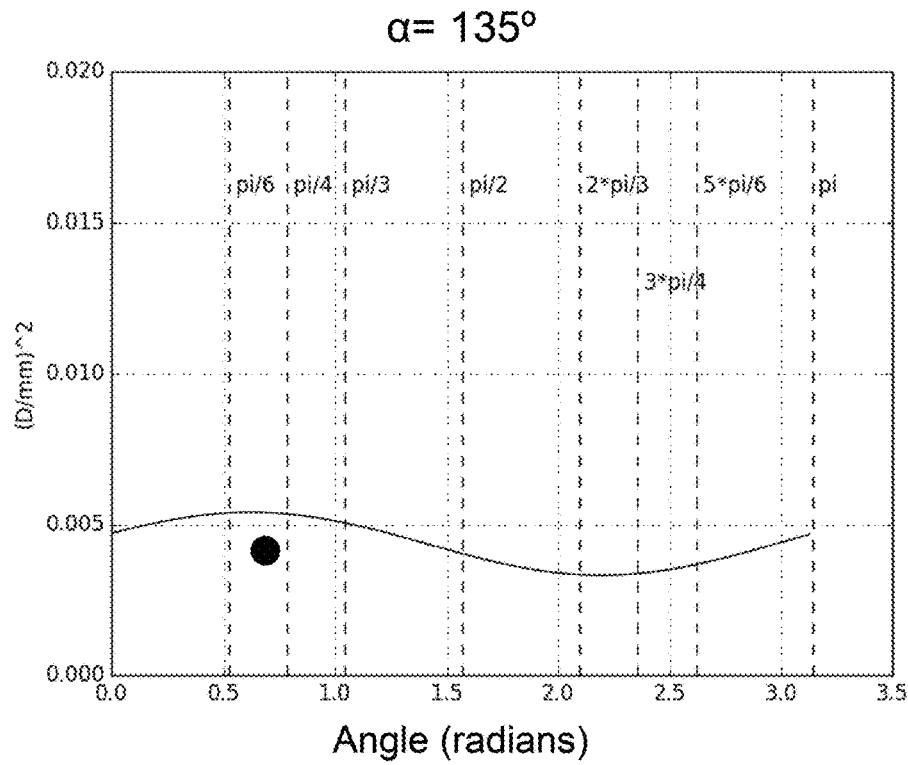
Figure 33K:
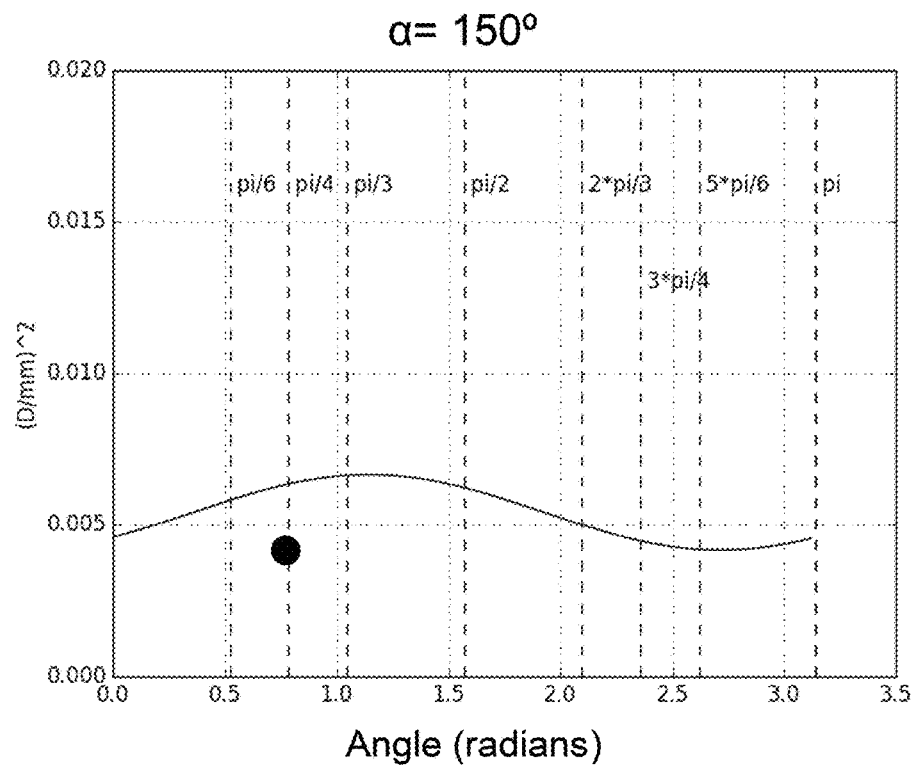
Figure 33L:
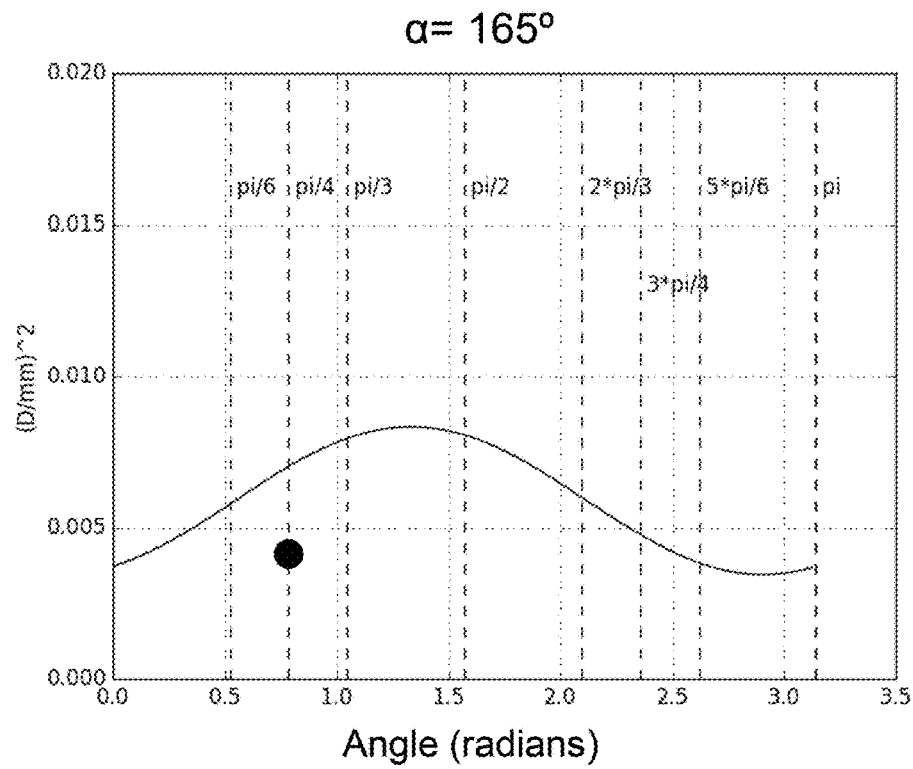
Figure 34A:
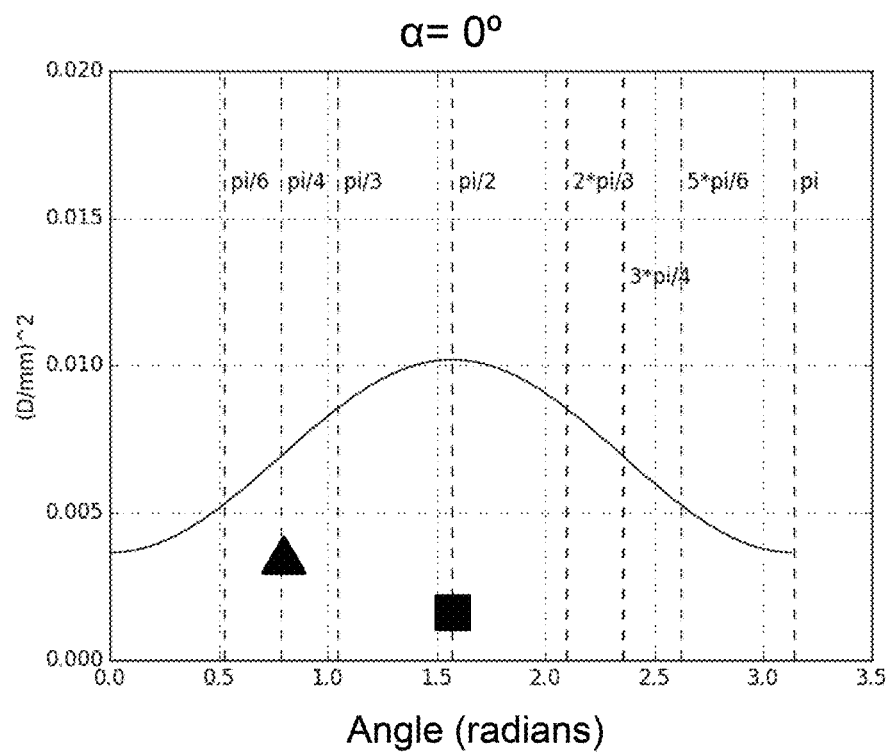
FIG. 34 shoes metric 2 for the four lenses of FIGS. 6 and 7.
Figure 34B:
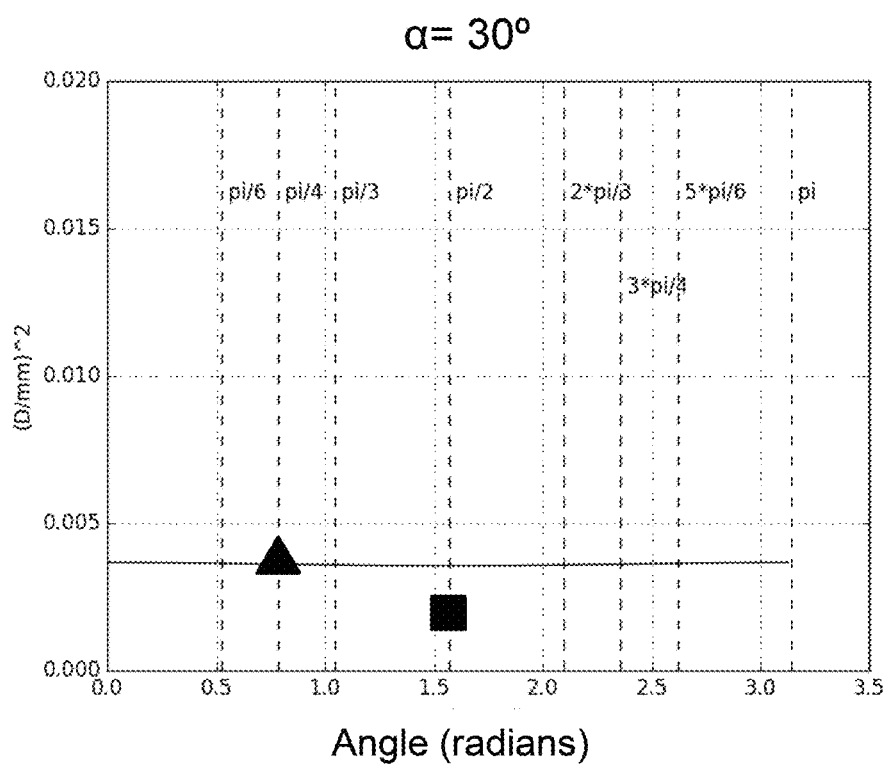
Figure 34C:
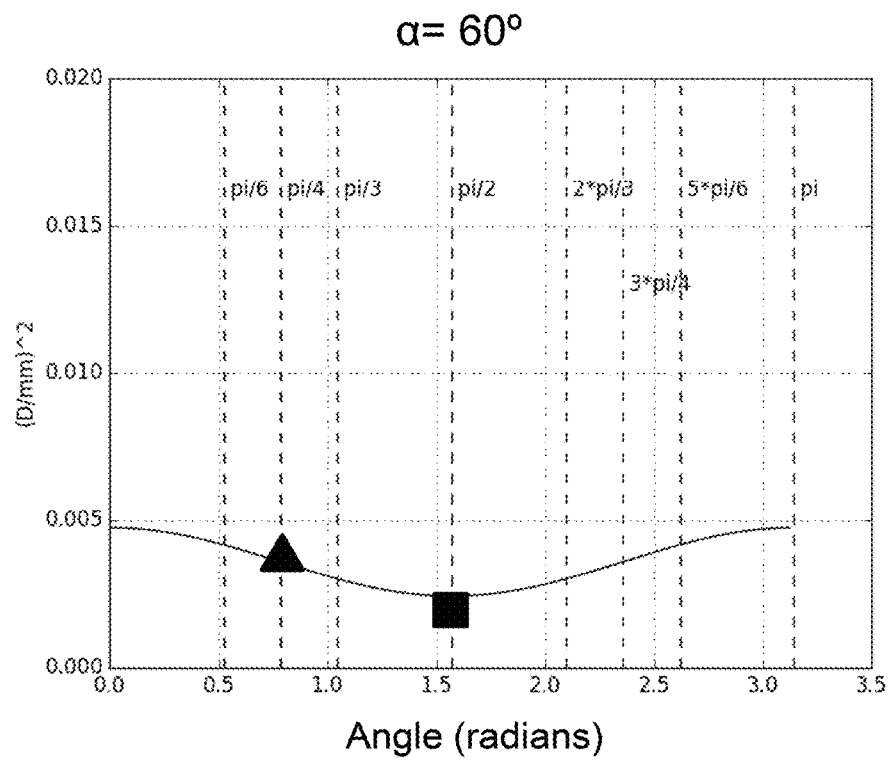
Figure 34D:
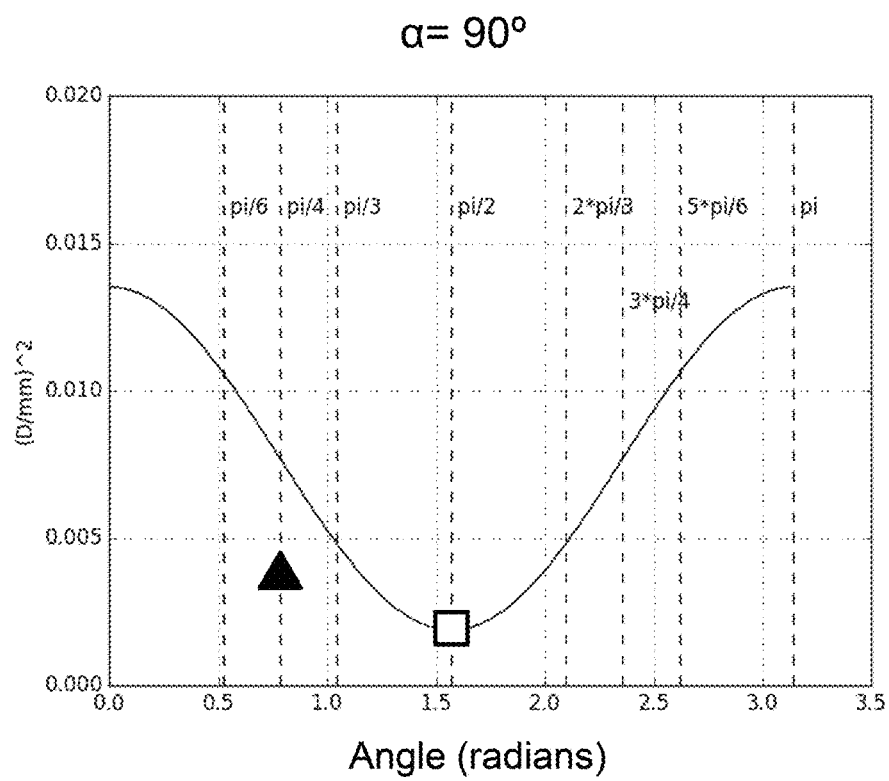
Figure 35:
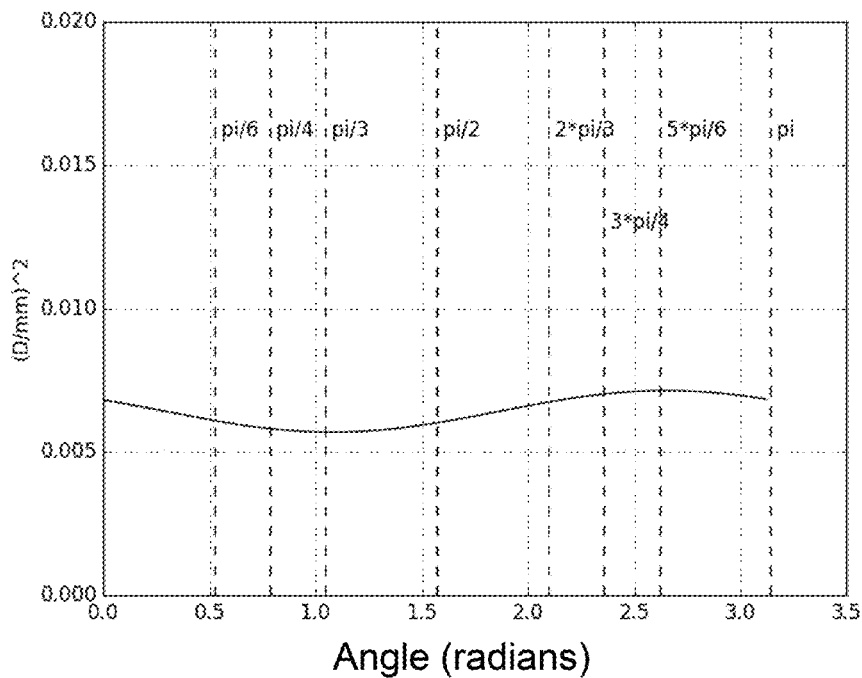
FIG. 35 shows the metric 1 for the Varilux S of Essilor using angle in radians, where "0 radians≤angle≤π radians".
Figure 36:
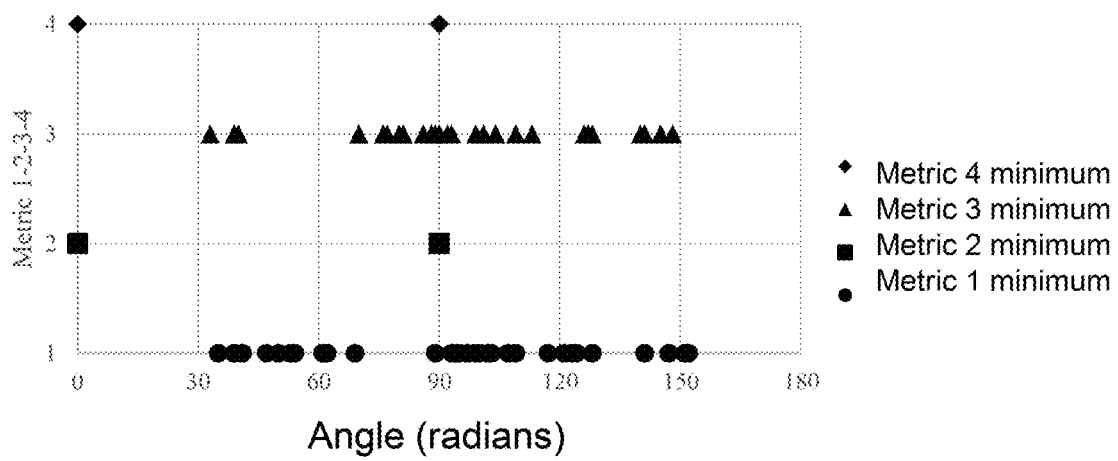
FIG. 36 minimums values of Metrics 1, 2, 3 and 4 for a plurality of lenses of the state of the art.
Figure 37:
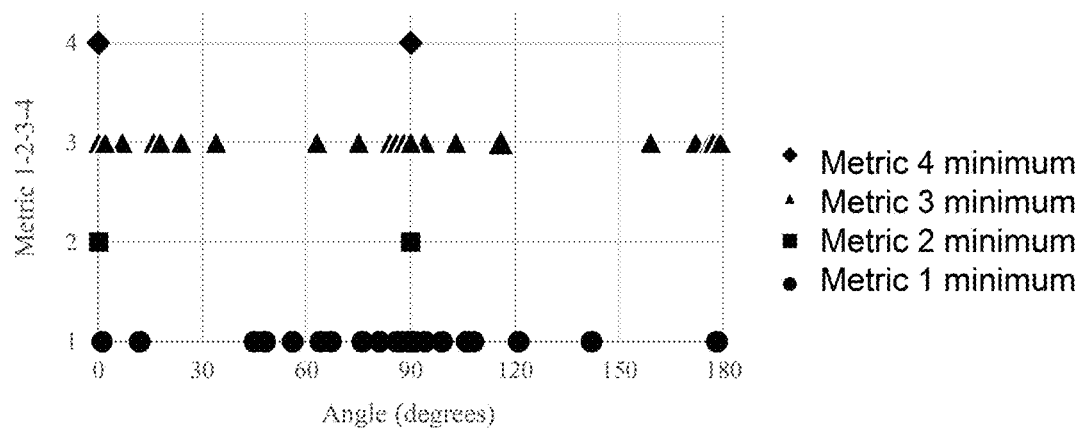
FIG. 37 minimums values of Metrics 1, 2, 3 and 4 for a plurality of lenses optimized according with the method of the present invention.

Now the image of FIG. 32B will be observed. Said metric 2 does not have a minimum for $\beta=45$ but rather for a $\beta$ which holds that $60<\beta<90$. The value of said metric for $\beta=45$ is marked with a triangle. The lenses of FIGS. 6 and 7 (see example M3 below), which have been optimised using the target function F of formula 2 with different values of $\alpha$, are now considered. Metric 2 of said lenses are depicted in FIGS. 34A-34D, and the value corresponding to $\beta=45$ for metric 2 of FIG. 32B is marked with a triangle. It should be pointed out that the curve is always above the triangle. This demonstrates that the lens optimised for $\alpha=45$ assumes its minimum for $\beta=45$. It can be observed that the lenses for $\alpha=30$ and $\alpha=60$ have a value of the metric for $\beta=45$ that is very similar to (but somewhat greater than) the lens with $\alpha=45$.

Example M2: the twelve lenses of FIG. 5 (lenses obtained with the minimisation of the target function by different degrees using formula 1) are considered, and metric 1 is calculated for each of the lenses. The values shown in FIGS. 33A-33L are obtained.

It can be observed that for the lens obtained with $\alpha=45$, the value of metric 1 assumes the minimum for $\beta=45$ (compared for all the values of the same curve with $0<\beta<180$). Said value is marked with a white circle. Furthermore, for the twelve lenses obtained using the same target function 1 and different values of $\alpha$, the value for $\beta=45$ of the metric 1 is always equal to or greater than the value of the metric 1 of $\beta=45$ of the lens obtained using $\alpha=45$. That is, the solid black dots of FIGS. 33A-33L are always below (or superimposed on) the line of metric 1.

Example M3: the four lenses of FIGS. 6 and 7 (power map and astigmatism map with the minimisation objective using formula 2 and $\alpha=0$, $\alpha=30$, $\alpha=60$, $\alpha=90$) are considered, and metric 2 is calculated for each of the lenses. The values of metric 2 are depicted in FIGS. 34A-34D for the 4 lenses.

It can be observed that the lens optimised with $\alpha=90$, the value of metric 2 obtained for $\beta=\alpha$ and the progressive lens in question, is the smallest of the values of metric 2 for said lens. See the white square. For metric 2, this is not necessarily true. What must be true, and is in fact true, is that for all the other lenses where the same target function (formula 2) with different values of a (for example, $\alpha=0$, $\alpha=30$, $\alpha=60$) has been used, the value of metric 2 is always above said value of metric 2 of the lens optimised with $\alpha=90$. That is, in FIGS. 34A-34D the square is always below the curve of the metric.

Metrics 3 and 4 can be calculated in a similar manner for other lenses.

In conclusion, the 4 proposed metrics allow determining which target function F, with which angle $\alpha$, optimises each of the lenses.

In this document, a method is patented which allows designing different families of progressive lenses in which the value of metrics 1, 2, 3 or 4 changes considerably by changing the $\alpha$ with which the lens has been optimised. Furthermore, said values of the metrics assume the minimum in different values of $\beta$. For metrics 1 and 3, the minimum is assumed in the $\beta=\alpha$ value, wherein $\alpha$ is the value for which the lens has been optimised according to the target function F. For metrics 2 and 4, the minimum is assumed in a $\beta$ value close to (but not necessarily exactly) $\alpha$. Furthermore, said value of the metric will be less than any other value of the metric evaluated in $\beta$, for all the other progressive lenses of the same family.

The invention claimed is:

1. A method for optimising a progressive ophthalmic lens in which the distribution of power and undesired astigmatism along an optical surface is optimised by minimising the function F:

$$F := \sum_{i=1}^{n} w1_i(Ast_i)^2 + w2_i(Pow_i - TargetPow)^2$$

wherein the weights $w1_i$ and $w2_i$ can be 0 or have any positive value, and wherein the subscript i indicates the different points of the surface of the lens,
wherein summation additionally comprises at least one term from the group formed by $$w4m_i \cdot \left(\frac{\partial Ast_i}{\partial x}\right)^m, w5m_i \cdot \left(\frac{\partial Ast_i}{\partial y}\right)^m, w6m_i \cdot \left(\frac{\partial Pow_i}{\partial x}\right)^m, w7m_i \cdot \left(\frac{\partial Pow_i}{\partial y}\right)^m$$

and multiplications thereof,
m being greater than or equal to 1,
and the weights $w4m_i$, $w5m_i$, $w6m_i$ and $w7m_i$ being able to have any value greater than or equal to 0
and wherein at least one of $w1_i$, $w2_i$, $w4m_i$, $w5m_i$, $w6m_i$, $w7m_i$, and multiplications thereof, has a non-zero value,
wherein if any of the terms of the group formed by $$\left(\frac{\partial Ast_i}{\partial x}\right)^m, \left(\frac{\partial Ast_i}{\partial y}\right)^m, \left(\frac{\partial Pow_i}{\partial x}\right)^m, \left(\frac{\partial Pow_i}{\partial y}\right)^m$$

and multiplications thereof is less than 0, then same is substituted by the absolute value thereof,
and wherein if m=2 and $w42_i=w52_i$, neither being 0, then summation additionally comprises at least one other term from said group; wherein Ast is the undesired astigmatism of the final lens, Pow is the power of the final lens, TargetPow is the desired distribution of power of the final lens being the prescription power taking the addition into account, and m is a constant.

2. The method according to claim 1, wherein summation additionally comprises the following terms:

$$w42_i \cdot \left(\frac{\partial Ast_i}{\partial x}\right)^2,$$

$$w52_i \cdot \left(\frac{\partial Ast_i}{\partial y}\right)^2, \text{ and}$$

$$2 \cdot w41_i \cdot w51_i \cdot \left(\frac{\partial Ast_i}{\partial x}\right) \cdot \left(\frac{\partial Ast_i}{\partial y}\right).$$

3. The method according to claim 2, wherein
$w42_i=\cos^2(\text{alpha})$,
$w52_i=\sin^2(\text{alpha})$, and
$w41_i*w51_i=\cos(\text{alpha})*\sin(\text{alpha})$;
wherein alpha is the angle of the prescription cylinder, or alpha is the angle of the inset being defined as the angle formed by the straight line joining the distance point with the near point with the horizontal axis.

4. The method according to claim 1, wherein summation additionally comprises the following terms:
$(w41_i*(dAst_i/dx)+w51_i*(dAst_i/dy))^p$, wherein p is a constant and has positive and even value.

5. The method according to claim 1, wherein summation additionally comprises the following terms:

$|w41_i*(dAst_i/dx)+w51_i*(dAst_i/dy)|.$

6. The method according to claim 1, wherein summation additionally comprises the following terms:
$\cos^2(\text{alpha})*(dAst_i/dx)^2$, and
$\sin^2(\text{alpha})*(dAst_1/dy)^2$ wherein $0° \leq \text{alpha} \leq 90°$; wherein alpha is the angle of the prescription cylinder, or alpha is the angle of the inset being defined as the angle formed by the straight line joining the distance point with the near point with the horizontal axis.

7. The method according to claim 1, wherein summation additionally comprises the following terms:

$\cos^2(\text{alpha})*(d\text{Pow}_i/dx)^2$, and $\sin^2(\text{alpha})*(d\text{Pow}_i/dy)^2$ wherein $0° \leq \text{alpha} \leq 90°$; wherein alpha is the angle of the prescription cylinder, or alpha is the angle of the inset being defined as the angle formed by the straight line joining the distance point with the near point with the horizontal axis.

8. The method according to claim 1, wherein summation additionally comprises the following terms:

$(w61_i*(d\text{Pow}_i/dx)+w71_i*(d\text{Pow}_i/dy))^p$, wherein p is a constant and has positive and even value.

9. The method according to claim 1, wherein summation additionally comprises the following terms:

$|w61_i*(d\text{Pow}_i/dx)+w71_i*(d\text{Pow}_i/dy)|$.

10. The method according to claim 3, wherein alpha is the angle of the prescription cylinder.

11. The method according to claim 3, wherein alpha is the angle of the inset, or the angle of the inset +90° or the angle of the inset +45°, the angle of the inset being defined as the angle formed by the straight line joining the distance point with the near point with the horizontal axis.

12. The method according to claim 3, wherein alpha is 0°.

13. The method according to claim 3, wherein alpha is 90°.

14. The method according to claim 3, wherein a visual map of the user is determined and wherein alpha is selected depending on the visual map of the user.

15. The method according to claim 3, wherein the optical surface is divided into several different zones each being independently optimized.

16. The method according to claim 3, wherein the method comprises placing the progressive ophthalmic lens into an eyeglass frame, wherein alpha is selected depending on an element of the position of wear of the eyeglass frame on the face of the user, wherein the element is an element from the group of elements formed by the monocular distance, the vertex distance, the pantoscopic angle at the setup height, and combinations thereof.

17. The method according to claim 3, wherein the weights $w4m_i$, $w5m_i$, $w6m_i$ and/or $w7m_i$ are multiplied by a value C which is the value of the prescription cylinder, such that it weights $w4m_i$, $w5m_i$, $w6m_i$ and/or $w7m_i$, giving a higher value to the weight the higher the absolute value of the cylinder is.

18. The method according to claim 3, wherein the weights w4mi, w5mi, w6mi and/or w7mi are multiplied by a value C and wherein C assumes the following values:

C=1 if the value of the prescription cylinder is less than or equal to 1 dioptre, and C=|Cyl| if the absolute value of the prescription cylinder is greater than 1 dioptre.

19. The method according to claim 1, wherein the optimisation is carried out with iterative, numerical or analytical methods, with or without restrictions.

20. A method for producing a progressive ophthalmic lens, wherein it comprises a method for optimisation according to claim 1, and a step for machining the optical surface.

21. The method according to claim 15, wherein independent optimisation is performed automatically.

22. The method according to claim 15, wherein independent optimisation is performed in an interactive manner during the phase of ordering the lenses.

23. The method according to claim 22, wherein independent optimisation is performed in an interactive manner by means of a software which visually displays the result of the optimisation before placing the order for the lenses.

24. The method according to claim 22, wherein the optician enters parameters for the distribution of the astigmatism gradient together with the rest of the data needed to place the order for the lenses.

* * * * *